United States Patent
Alsadah

(10) Patent No.: US 11,573,018 B2
(45) Date of Patent: Feb. 7, 2023

(54) AIR FLOW VESSEL AND SPRAY RING AIR PURIFICATION DEVICE

(71) Applicant: KING FAHD UNIVERSITY OF PETROLEUM AND MINERALS, Dhahran (SA)

(72) Inventor: Jihad Hassan Alsadah, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 65 days.

(21) Appl. No.: 17/400,185

(22) Filed: Aug. 12, 2021

(65) Prior Publication Data
US 2021/0372642 A1 Dec. 2, 2021

Related U.S. Application Data

(63) Continuation of application No. 16/454,660, filed on Jun. 27, 2019, now Pat. No. 11,118,801.

(51) Int. Cl.
| | |
|---|---|
| *B01D 47/02* | (2006.01) |
| *F24F 8/183* | (2021.01) |
| *F24F 3/14* | (2006.01) |
| *F24F 3/147* | (2006.01) |
| *F24F 8/10* | (2021.01) |
| *F24F 8/142* | (2021.01) |

(Continued)

(52) U.S. Cl.
CPC ............ *F24F 8/183* (2021.01); *B01D 47/021* (2013.01); *B01D 47/027* (2013.01); *F24F 3/1405* (2013.01); *F24F 3/147* (2013.01); *F24F 8/10* (2021.01); *F24F 8/133* (2021.01); *F24F 8/142* (2021.01); *F24F 8/117* (2021.01); *F24F 2003/144* (2013.01); *F24F 2110/20* (2018.01); *F24F 2110/50* (2018.01); *F24F 2203/02* (2013.01); *F24F 2203/12* (2013.01)

(58) Field of Classification Search
CPC ....... B01D 47/021; B01D 47/027; F24F 8/10; F24F 3/1405; F24F 3/147
See application file for complete search history.

(56) References Cited

U.S. PATENT DOCUMENTS

| | | |
|---|---|---|
| 3,693,326 A | 9/1972 | Deane |
| 3,789,585 A | 2/1974 | Arnold et al. |

(Continued)

FOREIGN PATENT DOCUMENTS

| | | |
|---|---|---|
| CN | 103754088 A | 4/2014 |
| JP | 2008-39297 | 2/2008 |

OTHER PUBLICATIONS

Littlegiant ; Instructions Model VCC-20S , VCC-20ULS ; 2008 ; 8 Pages.

(Continued)

*Primary Examiner* — Robert A Hopkins
(74) *Attorney, Agent, or Firm* — Oblon, McClelland, Maier & Neustadt, L.L.P.

(57) ABSTRACT

A hybrid humidity control and air purification device and method for hybrid humidity control and air purification. The hybrid device is a single unit capable of humidifying dry environmental air, dehumidifying humid environmental air and removing particulates and contaminants from the air. The device controls the outgoing air to a relative humidity setpoint between 35-50% with negligible particulate matter content. Particulate matter is transferred to water, which may be supplied and flushed by an automatic water pumping system.

7 Claims, 12 Drawing Sheets

(51) Int. Cl.
    *F24F 8/133*     (2021.01)
    *F24F 110/50*     (2018.01)
    *F24F 110/20*     (2018.01)
    *F24F 8/117*     (2021.01)

(56) References Cited

U.S. PATENT DOCUMENTS

| | | |
|---|---|---|
| 3,969,093 A | 7/1976 | Murray, Jr. |
| 4,922,691 A | 5/1990 | Shen |
| 2008/0127820 A1 | 6/2008 | Park et al. |
| 2017/0106333 A1 | 4/2017 | Zhu |

OTHER PUBLICATIONS

Aeroqual ; Particulate Matter Sensor Head PM10 / PM2.5 (PM) ; 2017 ; 2 Pages.
Stevens Water; Water Quality Sensors Overview ; Jul. 23, 2018 ; 14 Pages.
Burcam ; Installation Instructions Model 700700 Grinder Pump ;2015 ; Instructions ; 6 Pages.
Parker; Electric Expansion Valves SER, SERI, SEHI ; Feb. 2013 ; 20 Pages.
Air Quality Index (AQI) ; Air Quality Communication Workshop ; Apr. 16-17, 2012 ; 26 Pages.

AIR FLOW VESSEL AND SPRAY RING AIR PURIFICATION DEVICE

CROSS-REFERENCE TO RELATED APPLICATIONS

The present application is a Continuation of U.S. application Ser. No. 16/454,660, now allowed, having a filing date of Jun. 27, 2019.

BACKGROUND OF THE INVENTION

Field of the Invention

The present disclosure relates to a hybrid humidity control and air purification device, a method for hybrid humidity control and air purification, and a non-transitory computer readable medium having instructions stored therein that, when executed by one or more processors, cause the one or more processors to perform humidity control and air purification.

Description of the Related Art

Across the world, there are many countries which currently suffer from dangerously high levels of air pollution. These levels are exacerbated by environmental factors, such as dust storms, pollen, chemical pollutants, hydrocarbon particulates, and other factors.

The threat to health due to the aforementioned pollutants has reached a crisis level in many populated areas. For example, asthma is a chronic disease for two million people in Saudi Arabia. Across the world, over 300 million people are affected with asthma. Some common household pollutants are gaseous contaminants, particulate contaminants, such as soot, tobacco smoke, smog, oil smoke, fly ash, cement dust and household dust particles. Biological contaminants are also a concern, such as viruses, cat allergens, bacteria, dust mite allergens, mold spores and pollen.

Air pollution within a sealed environment, such as a home or apartment is a concern. Humans and animals inhale oxygen and exhale CO2, thus CO2 concentration levels can rise in such an enclosed environment with no outside air flow.

Table 1 shows how elevated levels of CO2 can cause illness in humans within the environment.

TABLE 1

CO$_2$ concentration Levels and Effect on Health

| CO$_2$ concentration | Effect on Health |
| --- | --- |
| 250-350 ppm | Normal background concentration in outdoor ambient air |
| 350-1,000 ppm | Concentrations typical of occupied indoor spaces with good air exchange |
| 1,000-2,000 ppm | Complaints of drowsiness and poor air. |
| 2,000-5,000 ppm | Headaches, sleepiness and stagnant, stale, stuffy air. Poor concentration, loss of attention, increased heart rate and slight nausea may also be present. |
| 5,000 | Workplace exposure limit (as 8-hour TWA) in most jurisdictions. |
| >40,000 ppm | Exposure may lead to serious oxygen deprivation resulting in permanent brain damage, coma, even death. |

The United States EPA Air Quality Index (https://www.epa.gov/sites/production/files/2014-05/documents/zell-aqi.pdf) sets air quality standards and advises citizens of their effect on health. An air quality index of 101 typically corresponds to the level that violates the national health standard. The index is based on the concentrations of 5 pollutants. The index is calculated from the concentrations of the following pollutants: Ozone, Nitrogen Dioxide, Sulphur Dioxide, $PM_{2.5}$ (particles with an aerodynamic diameter less than 2.5 µm) and $PM_{10}$ (particles with an aerodynamic diameter less than 10 µm). $PM_{2.5}$ is generally described as fine particles.

The EPA standards are color coded for ease of reference when reporting air quality levels to the public. For example, a color code of "green" refers to good air quality, "orange" alerts the public that air quality is poor and "maroon" refers to hazardous air quality. Table 2 for $PM_{2.5}$ and Table 3 for $PM_{10}$ show the health conditions for each color code, the color code value, and the respective 24 hour average particulate matter concentration value in micrograms per meter cubed.

TABLE 2

PM2.5 Air Quality Index Color Codes

| AQI Category | Color Code | AQI Value | 24 hr Avg PM$_{2.5}$ Conc. (µg/m$^3$) |
| --- | --- | --- | --- |
| Good | Green | 0-50 | 0-15.4 |
| Moderate | Yellow | 51-100 | 15.5-40.4 |
| USG | Orange | 101-150 | 40.5-65.4 |
| Unhealthy | Red | 151-200 | 65.5-150.4 |
| Very Unhealthy | Purple | 201-300 | 150.5-250.4 |
| Hazardous | Maroon | 301-500 | 250.5-500.4 |

TABLE 2

PM$_{10}$ Air Quality Index Color Codes

| AQI Category | Color Code | AQI Value | 24 hr Avg PM$_{2.5}$ Conc. (µg/m$^3$) |
| --- | --- | --- | --- |
| Good | Green | 0-50 | 0-54 |
| Moderate | Yellow | 51-100 | 55-154 |
| USG | Orange | 101-150 | 155-254 |
| Unhealthy | Red | 151-200 | 255-354 |
| Very Unhealthy | Purple | 201-300 | 355-424 |
| Hazardous | Maroon | 301-500 | 425-604 |

Additionally, air quality is affected by extremes of humidity. For example, coastal regions such as Jubail, Dammam, Jeddah in Saudi Arabia as well as the southeastern region of the United States have very high humidity levels. Central areas, such as Riyadh in Saudi Arabia and the southwestern region in the United States, have extremely dry climates. High humidity causes microbial biological growth which releases toxins/allergens to the environment. Extremely dry air conditions cause skin irritation as well as respiratory dangers in humans.

The control of air pollution and humidity within an enclosed environment has been addressed conventionally by devices which increase humidity levels, devices which lower humidity levels and devices which purify air. However, a single unit has not previously been known which can purify, humidify and dehumidify air as needed to result in a purified, humidity controlled air stream.

Zhu in US2017/010633 seeks to control the removal of air pollutants from contaminated environmental space air by allowing the contaminated air to contact an absorbent liquid medium. The liquid medium can be water or water mixed with at least one of sodium chloride, ethylene glycol, glycerin or a substance chosen to eliminate a particular pollutant. The air is first introduced into a toilet tank and allowed to bubble through the water in the tank before water pumping through at least one of the water mixtures. This reference uses a cartridge filter at the air output port to remove additional contaminants. The air is humidified and purified. The disclosure of Zhu does not seek to control humidity or temperature of the air by a cooling system or a heater, and requires a filter which must be changed by the user. Furthermore, the air cannot be dehumidified using this device.

Park in US20080127820 discloses a two-in-one humidifier and air purifier known as an air washer, which uses a wheel which rotates through a water bath. Air is blown over the wheel to humidify and remove particulates in the air. The speed of the wheel controls the degree of humidification. This device does not permit fine control of output air humidity nor does it dehumidify air which contains too much water vapor.

The present disclosure seeks to address the aforementioned problems of indoor air quality management by providing a system in a single unit which combines the functions of humidifying, dehumidifying and air purifying, where the output air humidity levels are carefully controlled. Additionally the inventive system uses tap water and is self-flushing through household sewer lines. A filter which must be cleaned by the user is not required, as the unit has a cleaning cycle which sanitizes the equipment. Details and embodiments of the invention are described more fully below.

SUMMARY OF THE INVENTION

The present invention provides a solution to the need for a hybrid device which can humidify, dehumidify and purify incoming air. The device includes components and circuitry configured to provide automated control of operation to setpoint levels based on sensor feedback. An exemplary method is described for controlling the hybrid humidity control and air purification device.

In a first embodiment, the hybrid humidity control and air purification device comprises an enclosure including a cyclonic vessel, a cold water bath, a heating chamber, a heat pump, a water pump, a secondary heater, an air intake port including a controllable fan and sensors, an air outlet vent including a controllable fan and sensors, and a controller.

In a second embodiment, the hybrid humidity control and air purification device comprises an enclosure including a cyclonic vessel, a first cold water bath, a second cold water bath including a phase change material, a heating chamber, a heat pump, a water pump, a secondary heater, an air intake port including a controllable fan and sensors, an air outlet vent including a controllable fan and sensors, and a controller.

In both the first and second embodiments, a water pumping system operates valves and the water pump to control the water levels and water quality within the cyclonic vessel and within the at least one cold water bath.

In both the first and second embodiments, an air flow system operates fans in the enclosure, the cyclonic vessel and in the at least one cold water bath.

In both the first and second embodiments, a sensor network measures at least one of water level, water quality, temperature, relative humidity, and particulate matter according to the EPA $PM_{2.5}$ standard and provides measurement signals to a controller.

In a third embodiment, a method for controlling the hybrid humidity control and air purification device is described. The controller has circuitry configured to control the device to operational setpoint levels based on the sensor signals.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
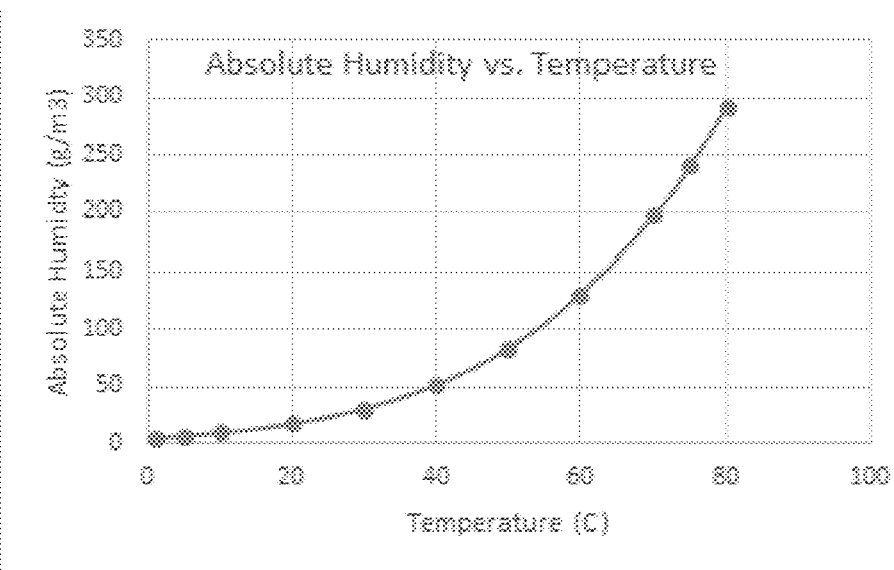
FIG. 1A shows a graph of absolute humidity versus temperature in the region of 0-100 degrees Celsius.

Referring now to the drawings, wherein like reference numerals designate identical or corresponding parts throughout the several views.

Further, as used herein, the words "a," "an" and the like generally carry a meaning of "one or more," unless stated otherwise. Furthermore, the terms "approximately," "approximate," "about," and similar terms generally refer to ranges that include the identified value within a margin of 10%, or preferably 5%, and any values therebetween.

As used herein, the terms "optional" or "optionally" means that the subsequently described event or circumstance can or cannot occur, and that the description includes instances where said event or circumstance occurs and instances where it does not.

Unless otherwise expressly stated or required by the claims, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be required.

As used herein, the term "particulate matter" refers to solid (particulate), gaseous materials, and/or liquid materials, and/or mixtures thereof, which may be present in the air as a suspension, aerosol, sol, or mixture and the like, in an amount which is measurably above background levels of such materials found in nature. In particular, "particulate matter" refers to a pollutant or contaminant that exceeds a concentration or level defined by a regulatory agency, such as the EPA, that can result in health or safety concerns. Examples of pollutants or contaminants are formaldehyde, ozone, formic acid, ammonia, sulfur dioxide, nitrogen oxides (NOx, including NO, $NO_2$), hydrogen sulfide, chlorinated hydrocarbons; volatile organic compounds (VOCs); industrial emissions from manufacturing facilities including refineries and the like; automobile emissions; workplace-generated emissions, particulate matter, including smoke and grease vapors from cooking; tobacco smoke, airborne dust containing heavy metals such as lead, cadmium, mercury, chromium and the like; allergens such as plant pollen; animal dander; including tobacco smoke and soot particles and the like; airborne microorganisms such as bacteria, fungal spores, and mites, viral particles and the like; and foul or obnoxious odors, including those from decomposing organic matter, human or animal wastepipe, urine or feces, and dust, including explosive dust, for example dust present in coal mines, generated in grain elevators, from special effects produced in filmmaking or pyrotechnics, from industrial operations such as grinding, machining or milling.

As used herein, the term "environmental air" refers to the air that exists within an environmental space which may have limited exchange with air outside the environmental space. The environmental air may or may not be contaminated with particulate matter. The environmental air is assumed to be controlled to a temperature of 21-23 degrees Celsius by an air conditioning system as is known in the art and which is not part of the present disclosure.

As used herein, the term "environmental space" refers to any space in which some control of the air quality and humidity is desired. This includes enclosed spaces or outdoor spaces in which environmental air quality can affect occupying individuals or objects.

Enclosed spaces include such spaces as rooms, compartments, chambers, buildings, dwellings and the like which have limited air exchange with the outdoor environment, but are otherwise suitable for occupancy or use by humans, livestock or pets; spaces used for the storage of objects subject to environmental conditions such as food, fruits, vegetables, i.e., vegetable stock rooms, meat and the like, or objects sensitive to the environment such as art work, musical instruments, furniture, antiques and the like. Examples of such enclosed spaces include rooms in homes and living quarters; offices and working areas including laboratories, medical facilities such as clinics, hospitals and doctor's offices, art galleries, warehouses, outbuildings; public buildings, such as schools, classrooms, auditoriums, arenas, indoor stadiums, and the like; hotels and other lodging accommodations; restaurants and other eating establishments; theaters, transportation stations, such as railway stations, bus or subway stations, and airport terminals; storage areas such as closets, refrigerators, dishwashers, closets, display cases, garages, hangars, and sheds; passenger/operator and cargo compartments in vehicles such as automobiles, trucks, trucks with climate controlled cargo space, vehicles used for space travel or exploration, motor homes, trains including climate controlled railway cars; aircraft including environmentally controlled airplane cargo holds and passenger compartments, passenger ships including staterooms, pubic areas and cargo holds, working or recreational water craft and the like.

The hybrid humidity control and air purification device is designed to purify air of contaminants and control the humidity of the air in an enclosed environment as mentioned above. The humidity is controlled to a setpoint range of 30-60%, preferably 35-50%. The air quality is controlled to meet EPA $PM_{2.5}$ standards. The temperature of the outgoing air is not deliberately controlled and can be warmer, colder or equal to the room ambient air temperature depending on the input relative humidity.

As used herein, the term "additive(s)" refers to any material dissolved or suspended in water to enhance degradation of contaminants or control the humidity of the environmental space air being treated. Such additives include salts, such as sodium chloride, potassium chloride, sodium sulfate, magnesium sulfate, calcium sulfate; surfactants; acid or base neutralizers, such as amino acids; buffering agents such as sodium bicarbonate or ammonium chloride; acids such as mineral acids such as hydrochloric acid, sulfuric acid and the like; bases such as mono-, di- and trialkylamines, alkaline metal hydroxides, alkaline earth hydroxides, and ammonia; oxidizing agents such as chlorine bleach, peroxides, peracids, or sodium hypochlorite, and ozone; reducing agents such as sugars and vitamin C; chelating agents such as EDTA; free radical scavengers such as hydroquinone, starch, cyclic dextrans; rheological agents, specific binding reagents such as dimedone and the like; aldehyde complexation agents such as sodium or potassium bisulfite, sulfide precipitation agents such as zinc oxide, or silver nitrate; and metal and metal oxide catalysts, including TiO2 as well as rare earth metal catalysts, including those that catalyze oxidative degradation of contaminants such as formaldehyde. The additives may also include materials which are biocides as defined below.

As used herein, the term "antiseptic additive" refers to one or more additives that can be added to the water to kill, control, or prevent mites, bacteria and their spores, fungi, molds, mildew and viruses, prolonging the service time of the media and stop the spread or distribution of pathogens that cause infectious diseases, such as tuberculosis or influenza. Examples include antimicrobial agents, bactericides, fungicides, and anti-viral agents, such as bleach, quaternary ammonium salts, ortho-phthalaldehyde and the like. Non-limiting examples of antiseptic additives are bleach, hydrogen peroxide, hydrogen peroxide adducts, strong acids and their diluted solution, strong bases and their diluted solutions, ortho-phthalaldehyde (OPA), glutaraldehyde, formaldehyde, povidone-iodine (PVP-I), iodine, iodophores, quaternary ammonium compounds (Quats or QACs), polyquats such as polyquaternium-42, quaternium-15, chlorhexidine gluconate, alcohols (ethanol, isopropyl alcohol), perchlorometaxylenol, and triclosan or a combination of the materials.

Additives also include preservatives which can act to prevent degradation of the liquid/additive mixtures by chemical, photochemical, or biological means. Some common preservatives include: Acetic Acid, Benzoic Acid, Citric Acid, Citric Acid Esters of Mono- and Diglycerides, Calcium Propionate, Erythorbic Acid, Ethyl lauroyl arginate, lactic acid, Methyl-p-hydroxy Benzoate, Methyl Paraben, Natamycin, Potassium Benzoate, Potassium Bisulphite, Potassium Lactate, Potassium Metabisulphite, Potassium Nitrate, Potassium Nitrite, Propyl-p-hydroxy Benzoate, Propyl Paraben, Propionic Acid, silver nanoparticles, Sodium Acetate, Sodium Ascorbate, Sodium Benzoate, Sodium Bisulphite, Sodium Diacetate, Sodium Erythorbate, Sodium Lactate, Sodium Metabisulphite, Sodium Nitrate, Sodium Nitrite, Sodium Propionate, Sodium Salt of Methyl-p-hydroxy Benzoic Acid, Sodium Salt of Propyl-p-hydroxy Benzoic Acid, Sodium Sorbate, Sodium Sulphite, Sodium Dithionite, Sorbic Acid, Sulphurous Acid, and Tartaric Acid.

Natural food antimicrobials compounds can be also considered preservatives as well. Examples of these compounds are Lacto-antimicrobials, Ovo-antimicrobials, phyto-antimicrobials, bactor-antimicrobials, acid-antimicrobials, Milieu-antimicrobials.

Natural antimicrobial compounds can be used such as berberine and many other antimicrobial or antiviral compounds from natural sources from plants or microorganisms. The crude plant materials containing the antimicrobial compounds can be used directly. These materials can be solids or powders that can be added into water volume in the cold water bath or baths.

"Phase change materials" refers to any material which can absorb heat into its structure and melts from a solid phase to a liquid phase. The phase changing temperature is preferred to be in the range of 2-10 degrees Celsius for precise and stable water and air temperature control. A phase change material can be any pure material including: paraffin wax of 14 carbon atoms, paraffin wax of 15 carbon atoms, formic acid, peanut oil or any other pure material that has melting temperature in the range of 2-10 degrees Celsius. The phase changing material could also be a mixture of two or more materials that have a phase changing temperature in the range of 2-10 degrees Celsius including a mixture of tetradecane and hexadecane. The phase changing material (PCM) can be in bulk form or encapsulated. The encapsulated phase changing materials can be placed in the cold water bath to stabilize its temperature. Other forms of encapsulation are possible including jackets of PCM, slabs of PCM or tubes of PCM. The above examples are stated as a few non-limiting examples.

As used herein, the term "fan" refers to any device capable of moving air in a manner that allows for efficient mixing of the air in the enclosed space. Such devices include air water pumps, air compressors, fans, or blowers. The fans require an electric power source, such as AC power or DC power, and which may be supplied by batteries, fuel cells, rechargeable batteries, electrochemical batteries as non-limiting examples, and circuitry for selectively controlling the fan. The device may transfer air by means of adding positive pressure ("water pumping") or by exerting negative pressure ("sucking") in order to cause air to flow in the desired fashion.

As used herein, the terms "tube" and "tubing" refer to a means for transferring air, such as a hoses, tubing (ex. rubber, polyurethane), or pipes (metal or PVC). The tubing may optionally be treated to inhibit microbial colonization on the tubing's inner surface or to resist degradation from mildew, algae, fungi and biofilms, such as that sold by Actifresh Antimicrobial Polyethylene tubing, https://www.theperfectwater.com/antimicrobial-Tubing.html.

The air intake ports, air outlet ports and air vents may be constructed of ductwork, rubber, plastic or polymer, as non-limiting examples. The air intake ports, air outlet ports and air vents of the disclosure may support fans and may include sensors for measuring air temperature, relative humidity and particulate matter content.

Figure 11:
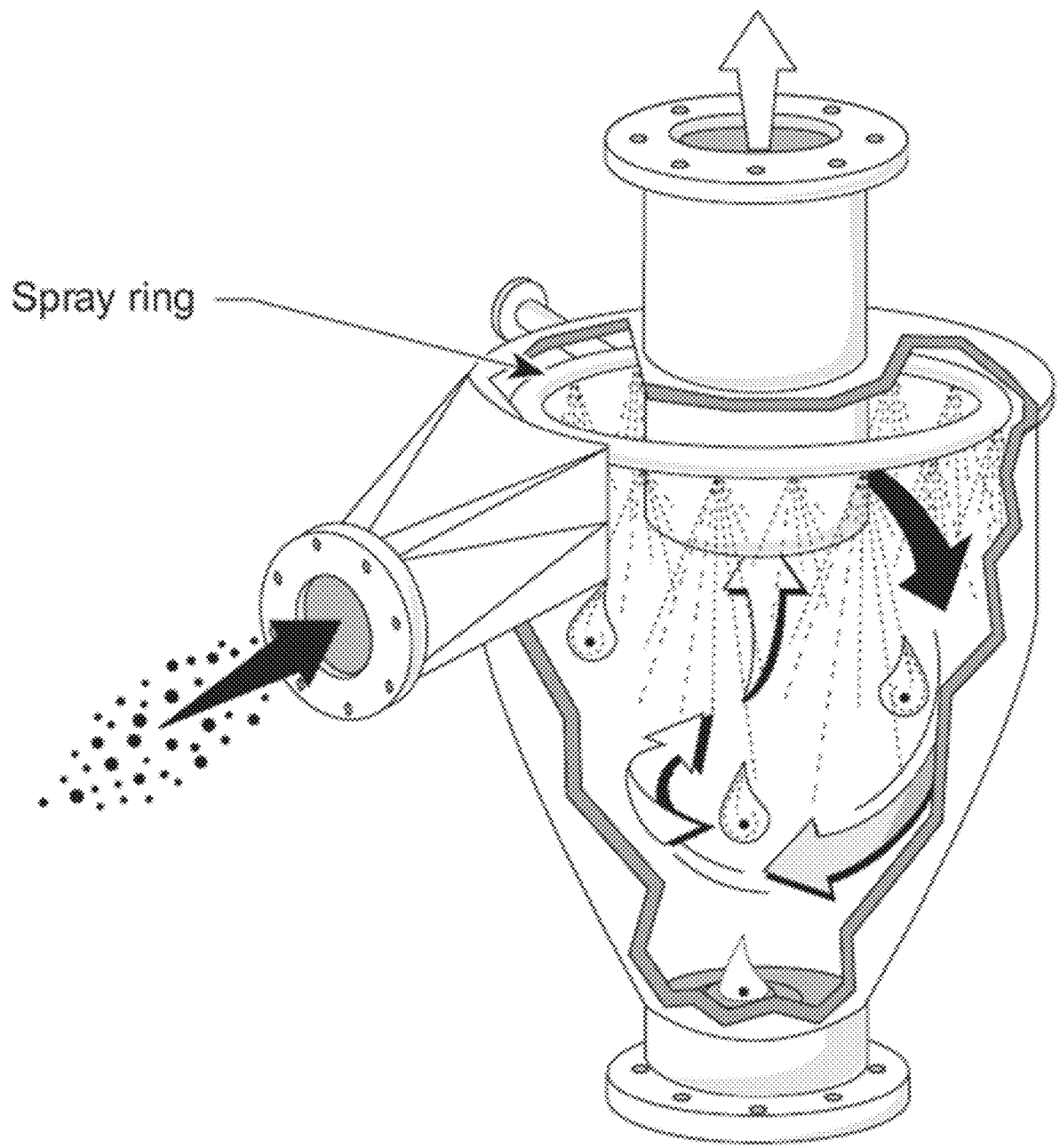
FIG. 11 shows an exemplary cyclonic vessel.

A "cyclonic vessel" is a scrubber device which uses spiral air flow and a water spray to remove particles from a gaseous or liquid carrying medium. A water stream enters the top or side of a truncated cone shaped vessel and passes through the holes of a spray ring. The water is directed by the spray ring to the sides of the vessel. Particle laden air enters an air inlet tangentially to an inner chamber, swirls through the chamber in a cyclonic motion which forces heavier particles to the sides of the vessel, where they are carried by the water spray to a pool of water in the truncated cone end. The air is forced to swirl downward, reverse direction, and return upward in a tighter spiral. The purified air enters a flue tube, moves to the top of the vessel and exits through an air outlet port. A cyclonic vessel of the type described above is shown in FIG. 11. Other cyclonic vessels applicable to the disclosure are found in U.S. Pat. Nos. 3,696,326; 4,922,691; and/or 7,115,155.

Additionally, the motion of the air within the cyclonic vessel may be assisted by fans at the air inlet and air outlet ports. Further, the spray ring may have a motor which turns the ring to assist the spraying effect.

FIG. 1A shows a graph of absolute humidity versus temperature in saturated air. Absolute humidity is the measure of the water vapor content in the air, expressed as grams of moisture per cubic meter of air ($g/m^3$).

The maximum absolute humidity of warm air at 30° C./86° F. is approximately 30 g of water vapor, expressed as 30 $g/m^3$. The maximum absolute humidity of cold air at 0° C./32° F. is approximately 5 g of water vapor, or 5 $g/m^3$.

Relative humidity also measures water vapor but relative to the temperature of the air. It is expressed as the amount of water vapor in the air as a percentage of the maximum amount of vapor that could be held at its current temperature.

Warm air can hold far more moisture than cold air meaning that the relative humidity of cold air is far higher than warm air if their absolute humidity levels are equal.

Figure 1B:
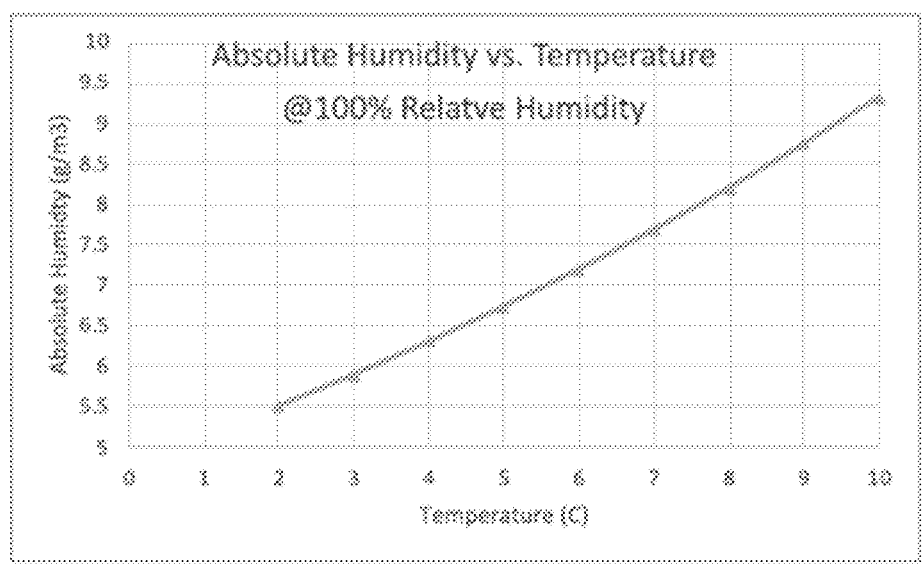
FIG. 1B shows the graph of absolute humidity versus temperature in the region of 2-10 degrees Celsius.

FIG. 1B shows a graph of absolute humidity versus temperature in the range of 0-10 degrees Celsius, when the relative humidity is at 100%. In this range, the graph shows an approximately linear relationship between temperature and absolute humidity.

Figure 2A:
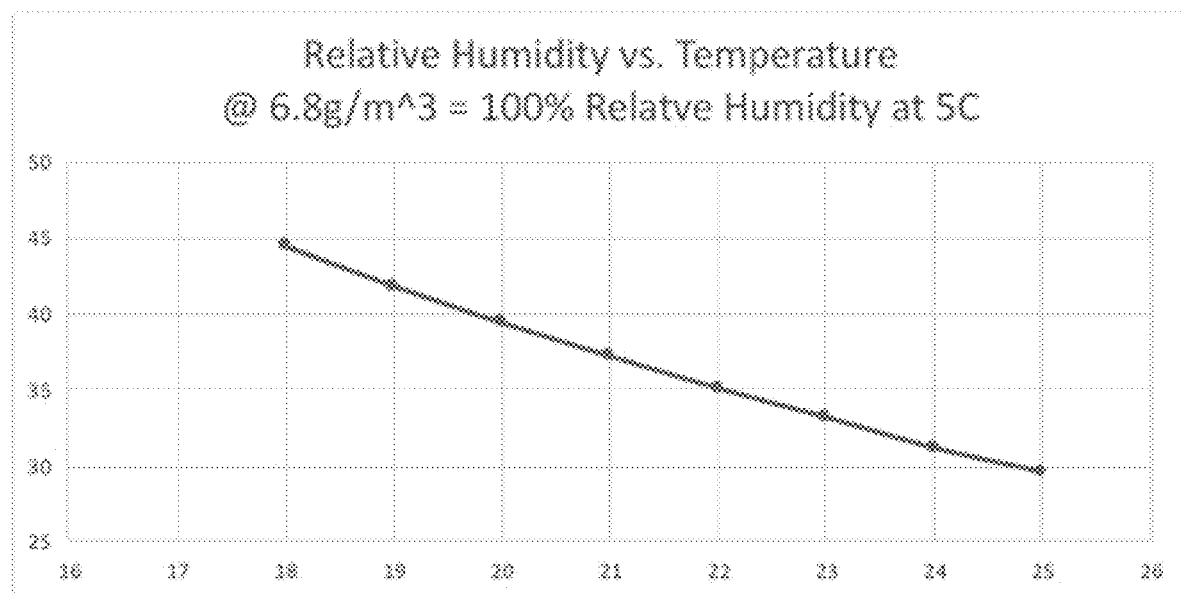
FIG. 2A shows a graph of relative humidity versus temperature over the temperature range of 16-26 degrees Celsius.

FIG. 2A depicts how relative humidity varies with temperature for an absolute humidity of 6.8 $g/m^3$. An absolute humidity of 6.8 $g/m^3$ equals 100% relative humidity at 5 degrees Celsius. The temperature range is defined for a range commonly found comfortable in living quarters. Between the temperatures of 18-25 degrees Celsius, the relative humidity falls with increasing temperature and the relationship is approximately linear.

Figure 2B:
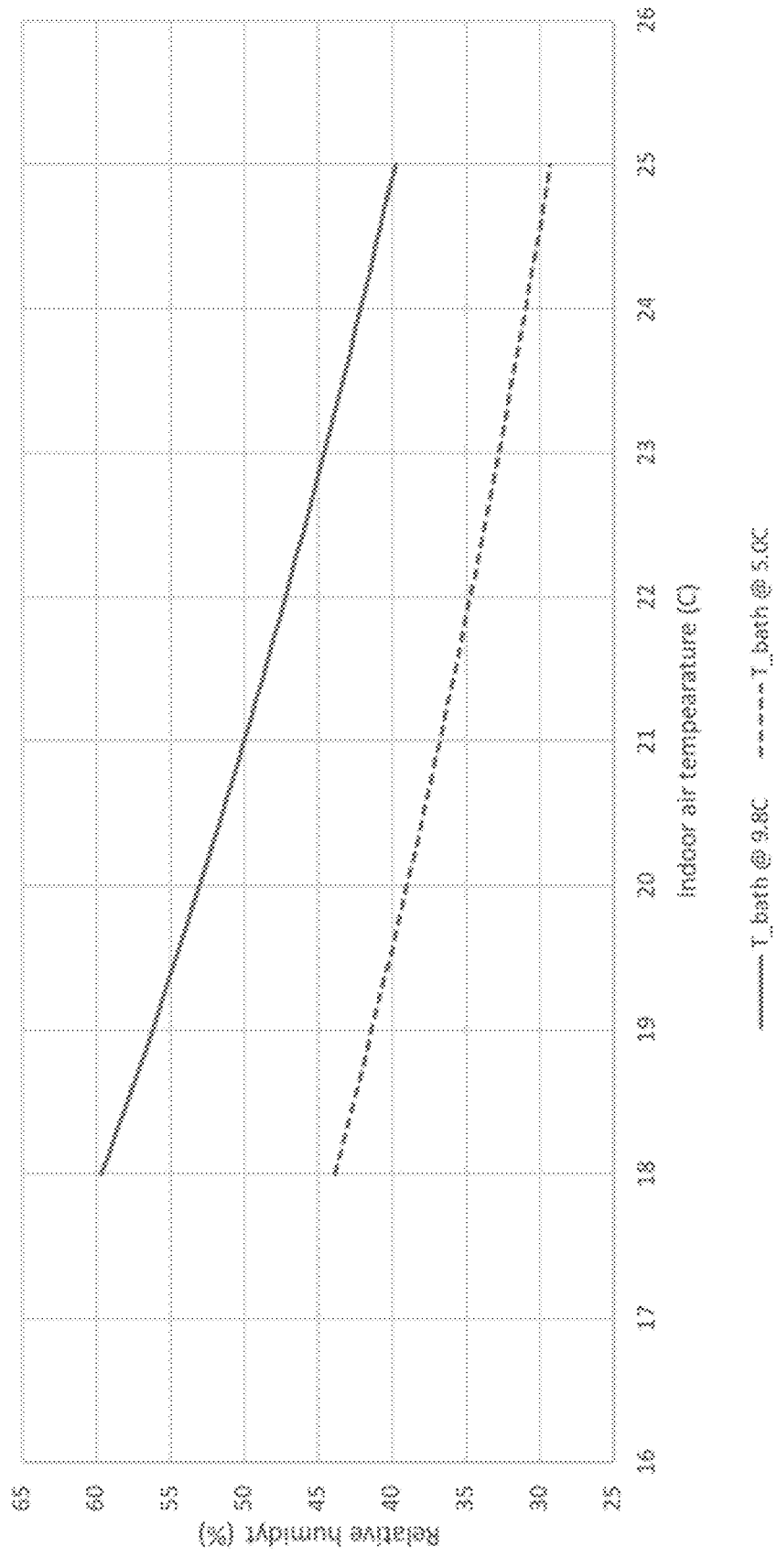
FIG. 2B shows a graph of relative humidity versus indoor air temperature for cold water bath temperatures of 5 and 10 degrees Celsius.

Referring back to FIG. 1B, an absolute humidity of 6.8 $g/m^3$ falls in the region of 5-6 degrees Celsius. Thus, setting the absolute humidity of the air to 6.8 $g/m^3$ will yield a relative humidity of 30-45% when the air temperature is in the range of 18-25 degrees Celsius, as shown in FIG. 2A and FIG. 2B. When the air temperature is set to 20 degrees Celsius, then the corresponding relative humidity is approximately 40%.

Referring to FIG. 2B and back to FIG. 1B, an absolute humidity of 9.3 $g/m^3$ falls in the region of 9.8 degrees Celsius. Setting the absolute humidity of the air to 9.3 $g/m^3$ will yield a relative humidity of 50% when the air temperature is about 21 degrees Celsius. More generally, setting the absolute humidity of the air to 9.3 $g/m^3$ will yield a relative humidity of 40-60% when the air temperature is in the range of 18-25 degrees Celsius.

The invention described below in the exemplary embodiments seeks to use the relationship between absolute humidity, relative humidity and temperature as shown above.

Air is saturated at a temperature of 4-10 degrees Celsius and the saturated air is then heated to room temperature (18-25 degrees Celsius). This produces air of relative humidity 40-60%. Due to the approximately linear relationship between humidity and temperature in this range, a high degree of control of the humidity in the air can be accomplished through controlling the water bath temperature and ensuring saturation of air at the water bath temperature. This method enables humidification control independent of the input air relative humidity.

Figure 3:
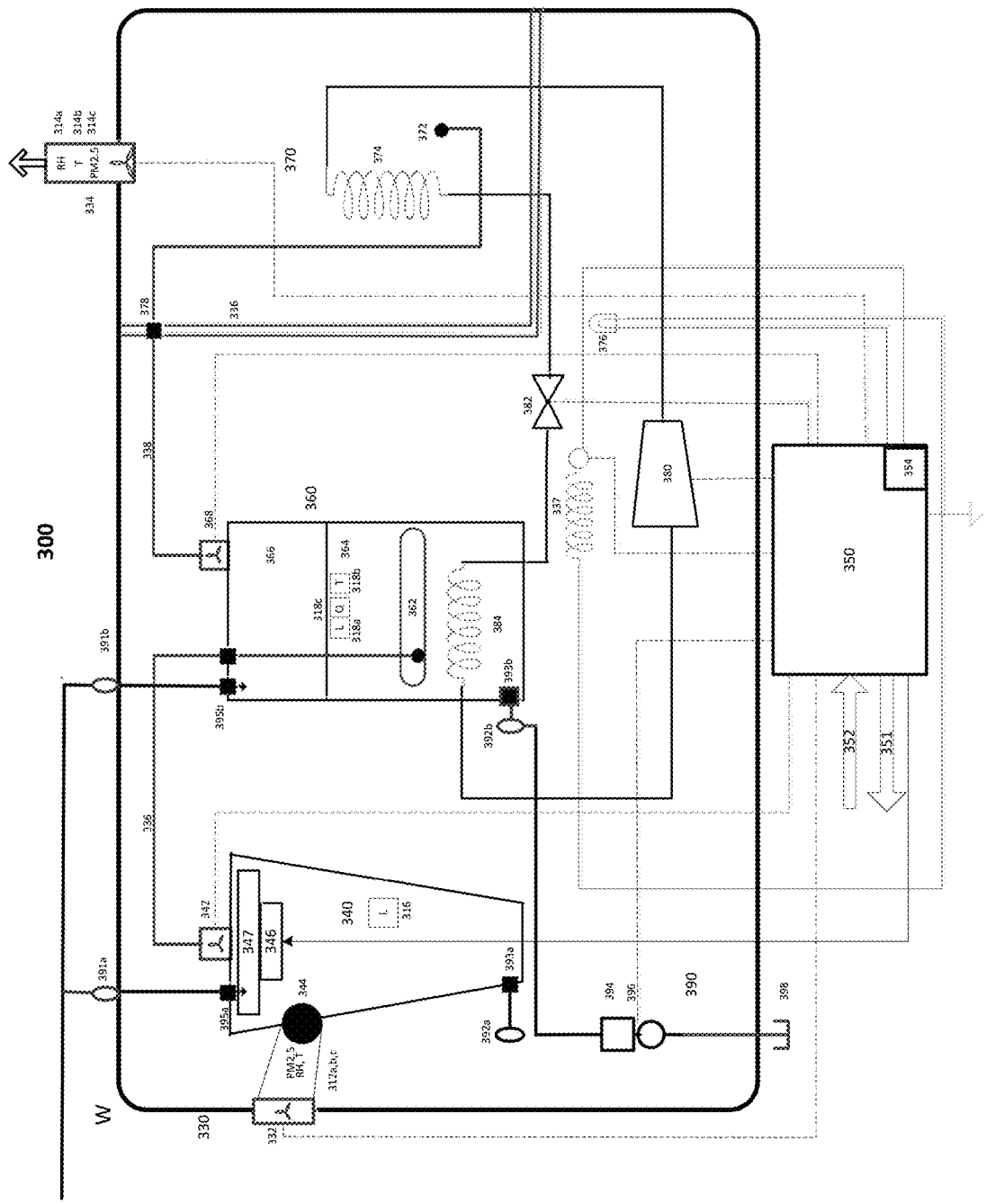
FIG. 3 shows an exemplary embodiment of the apparatus having a single cold water bath.

FIG. 3 shows the first embodiment of the hybrid humidity control and air purification device 300. The device includes a cyclonic vessel 340, a cold water bath 360, a heating chamber 370, a heat pump compressor 380, a water pump 396, a secondary heater 337, an environmental air intake port 332, an air outlet vent 334 and a controller 350. An optional enclosure 330 may support the components of the device.

The environmental air intake port 332 includes a first controllable fan, a first relative humidity sensor (RH, 312*a*), a first temperature sensor (T, 312*b*) and a first particulate matter sensor ($PM_{2.5}$, 312*c*).

The environmental air outlet vent 334 has a second controllable fan, a second relative humidity sensor 314*a*, a second temperature sensor 314*b*, and a second particulate matter sensor 314*c*.

The cyclonic vessel 340 has a cyclonic vessel air intake port 344 connected to the environmental air intake port 332; a cyclonic vessel air outlet port 342 including a third controllable fan, the cyclonic vessel air outlet port 342 connected to the first end of a cyclonic vessel air outlet tube 336; a first water level sensor 316; and a controllable cyclonic vessel motor 346 for rotating a spray ring 347.

The cold water bath 360 includes a cold water bath air intake port to receive the second end of the cyclonic vessel air outlet tube 336; a volume of water 364; a cooling coil 384 located in the volume of water; a second water level sensor 318*a*, a third temperature sensor 318*b* and a first water quality sensor 318*c* located within the volume of water; a microbubbling filter 362 connected to the second end of the cyclonic vessel air outlet tube 336; an optional encapsulated phase change material; a volume of air 366 located above the volume of water; a cold water bath air outlet port 368 located above the volume of air, the cold water bath air outlet port including a fourth controllable fan; the cold water bath air outlet port connected to the first end of a cold water bath air outlet tube 338.

Optionally, the microbubbling filter 362 and volume of water 364 may be replaced and/or supplemented by a nozzle which sprays water in the cold water bath chamber, thus entraining water droplets into the air of the chamber. As the environmental air passes from the cyclonic vessel air outlet tube 336, through the water droplets and into the cold water bath air outlet port, the humidity of the environmental air increases/decreases to match the humidity of the air in the cold water bath air volume.

Optionally, the upper part of the cold water bath which encloses the air volume may include a spray nozzle for spraying water, which entrains water droplets into the volume of air. As the environmental air passes from the microbubbling filter, through the water droplets and into the cold water bath air outlet port, the humidity of the environmental air increases/decreases to optionally match the humidity of the air in the cold water bath air volume.

The heating chamber 370 includes a heating chamber air intake port 378 for receiving the second end of the cold water bath air outlet tube 338; a support 372, wherein the support is connected to the second end of the second air outlet tube 338; a heating coil 374; wherein the heating chamber is connected to the environmental air outlet vent 334.

The heat pump comprises a compressor 380 which has a controllable compressor motor (not shown), wherein the compressor is connected to the cooling coil 384, a variable expansion valve 382, and the heating coil 374, wherein the variable expansion valve is connected between the cooling coil 384 and the heating coil 374.

The controller has circuitry connected to and configured to control the fans; the compressor motor and the variable expansion valve 382. The controller may include a microprocessor, one or more memory units, a switching network, a remote control panel and a communications network and antenna for communicating with wireless sensors and/or outside communications. An exemplary controller will be described in more detail below.

The controller is further connected to and has circuitry configured to receive wired or wireless signals from the particulate matter sensors (312*c*, 314*c*), the relative humidity sensors (312*a*, 314*a*), the temperature sensors (312*b*, 314*b*, 318*b*), the water quality sensor 318*c*, and the water level sensors (316, 318*a*).

The controller circuitry is further configured to control the relative humidity, temperature and air quality of the air expelled through the environmental air outlet vent, based on the signals 352 received from the sensors.

In a non-limiting example, the temperature sensors and relative humidity sensors may be separate units or may be combined in one unit, such as those manufactured by Swift Sensors, https://www.swiftsensors.com/product-category/sensors/. The sensors may be wired or wireless, and may contain batteries or be directly connected to a power source in the controller. The sensors may communicate with the controller through a wired or wireless connection, as is indicated at 352 in FIG. 3.

In a non-limiting example, the particulate matter sensors of the disclosure may be of the type manufactured by Aeroqual, https://www.aeroqual.com/product/particulate-matter-sensor-pm10_pm2-5. Aeroqual's PM Sensor Head offers precision active sampling, Fast T90 response time, humidity compensation, K factor adjustment and is compatible with a wide range of gaseous measurements.

Figure 4:
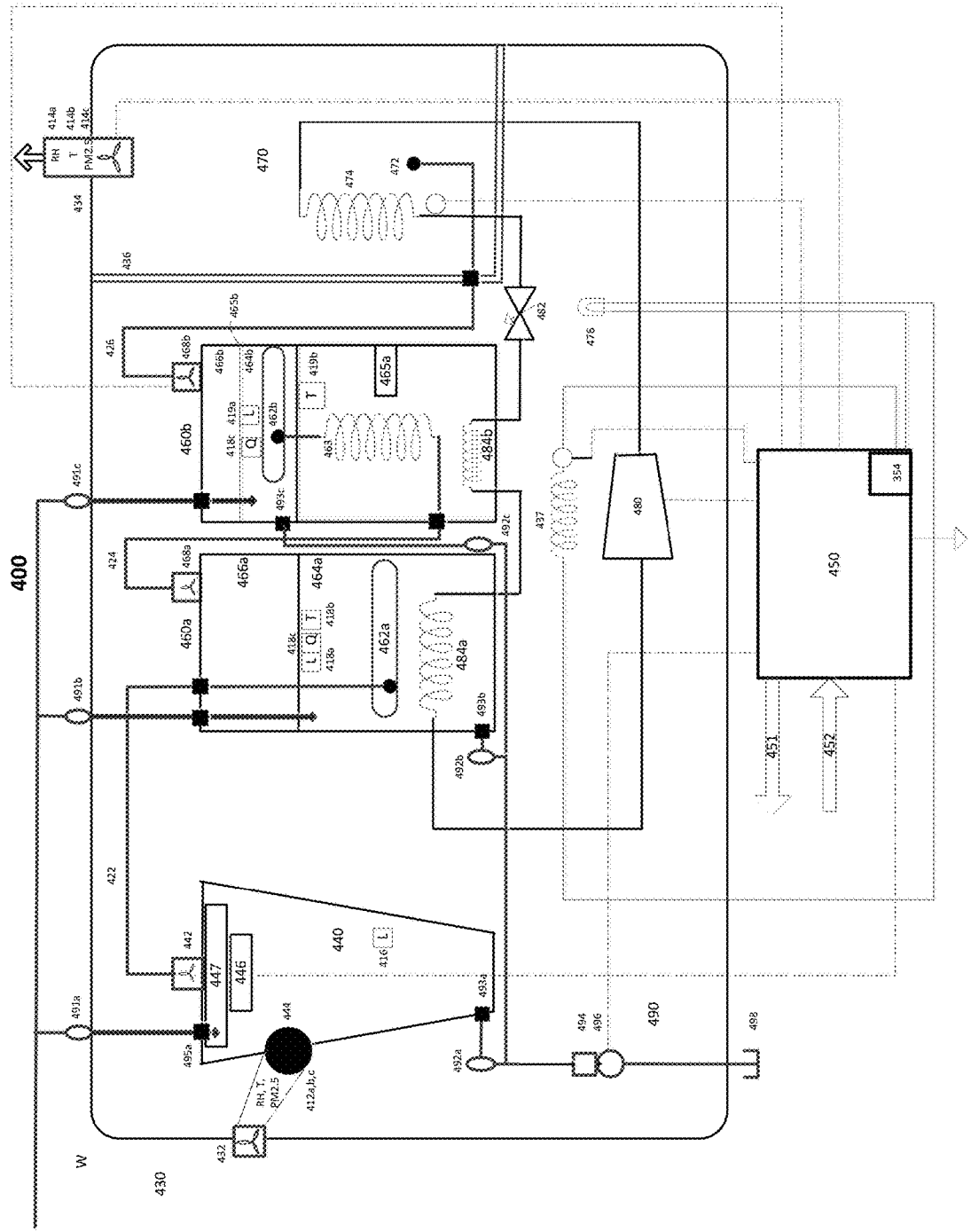
FIG. 4 shows an exemplary embodiment of the apparatus having a second cold water bath and phase change material.

In the second embodiment, as shown in FIG. 4, the cold water bath (360) of the first embodiment is modified to comprise a first cold water bath 460*a* and a second cold water bath 460*b*. The enclosure (330, 430), cyclonic vessel (340, 440), heat pump, secondary heater (337, 437), and heating chamber (370, 470) are essentially the same as those shown in FIG. 3.

The first cold water bath 460*a* includes a first cold water bath air intake port configured to receive the second end of the cyclonic vessel air outlet tube (322, 422); a first volume of water 464*a*; a first cooling coil 484*a* located in the first volume of water; a second water level sensor 418*a*, a third temperature sensor 418*b* and a first water quality sensor 418*c* located within the first volume of water; a first microbubbling filter 462*a* connected to the second end of the cyclonic vessel air outlet tube (322, 422); a first volume of air 466*a* located above the first volume of water 464*a*; a first cold water bath air outlet port 468*a* located above the first volume of air, the first cold water bath air outlet port 468*a* including a fourth controllable fan; the first cold water bath air outlet port connected to the first end of a first cold water bath air outlet tube 424.

The second cold water bath 460b includes a first chamber 465a which has a second cold water bath air intake port configured to receive the second end of the first cold water bath air outlet tube 424; a phase change material, a fourth temperature sensor 419b, a second cooling coil 484b; a cooling loop 463 having a first end and a second end, wherein the second end of the first cold water bath air outlet tube 424 is connected to the first end of the cooling loop 463; a second chamber 465b, located above the first chamber 465a, wherein the second chamber contains a second volume of water 464b, a third water level sensor 419a, a second microbubbling filter 462b fluidly connected to the second end of the cooling loop 463; a second volume of air 466b located above the second volume of water 464b, and a second cold water bath air outlet port 468b including a fifth controllable fan, wherein the second cold water bath air outlet port is connected to the first end of a second cold water bath air outlet tube 426.

The heat pump comprises a compressor 480 which has a controllable compressor motor (not shown), wherein the compressor is connected to the first cooling coil 484a, the second cooling coil 484b, a variable expansion valve 482, and a heating coil (374, 474), wherein the variable expansion valve 482 is connected between the second cooling coil 484b and the heating coil 474. The controller 450 has circuitry connected to and configured to control the controllable fans; the compressor motor and the variable expansion valve 482.

The controller is further connected to and has circuitry configured to receive signals from the particulate matter sensors (412c, 414c), the relative humidity sensors (412a, 414a), the temperature sensors (412b, 414b, 418b, 419b), the water quality sensor 418c, and the water level sensors (416, 418a, 419a) as shown by arrow 452.

The controller circuitry is further configured to control the relative humidity, temperature and air quality of the air expelled through the environmental air outlet vent based on the signals 452 received from the sensors.

The microbubbling filter, also known as a micro sparger, has micron sized pores which break the air into micron sized bubbles, thus increasing the surface area of the air. This results in a higher uptake of water molecules into the air, thus increasing the humidity of the air flow. In a non-limiting example, the microbubbling filters (362, 462a, 462b) are of the type manufactured by Mott Corporation, 84 Spring Lane, Farmington, Conn., USA, https://mottcorp.com/sites/default/files/HPBIOMICRO_1.pdf.

The variable expansion valve (382, 482) described above is of the type which is electrically actuated by a controller. In a non-limiting example, valves of this type are of the SER series manufactured by Parker Hannifin, Cortonwood Drive, Brampton, Barnsley S73 OUF—United Kingdom. The SER, SERI and SEHI are Electronically Operated Step Motor flow control valves, intended for the precise control of liquid refrigerant flow. Synchronized signals to the motor provide discrete angular movement, which translate into precise linear positioning of the valve piston. Valve pistons and ports are uniquely characterized, providing extraordinary flow resolution and performance. The SER, SERI and SEHI valves are easily interfaced with microprocessor based controllers.

Water quality sensors measure the amount of total dissolved solids (TDS) in the water. TDS is measured in parts per million. TDS tell how many units of impurities there are for one million units of water. For example, drinking water should be less than 500 ppm, water for agriculture should be less than 1200 ppm, and high tech manufactures often require impurity-free water. In a non-limiting example, water quality sensors of this type are manufactured by Stevens Water Monitoring Systems, Inc. 12067 N E Glenn Widing Drive, Suite 106, Portland, Oreg., USA, 97220. https://www.stevenswater.com/news-and-articles/water-quality-sensors-overview/.

In a non-limiting example, water level sensors of the type used in the device can be MPM489 W Level Transmitter, manufactured by Micro Sensor Co., LTD No. 18, Yingda Road Baoji, P. R. China 721006. https://www.sensor-test.de/ausstellerbereich/upload/mnpdf/en/MPM489 W datasheet2012_14.pdf The enclosure is constructed of at least one of plastic, fiberglass, steel, copper, aluminum, Styrofoam, or any structural material capable of supporting the components within the enclosure. The enclosure is sized to contain the components of the hybrid humidity and air purifying device in a single unit.

However, the enclosure is optional in a more distributed system, such as for large scale systems. The enclosure may also be optional where space limitations make it desirable to place components of the device in separated locations. Further, the enclosure is optional in adapting the hybrid humidity control and air purification device as an aftermarket product to an existing housing.

In the first and second embodiments, the enclosure (330, 430) further includes an optional controllable ultraviolet light (376, 476), and the controller actuates the optional controllable ultraviolet light based on the measurements of the at least one water quality sensor. The enclosure may include a plurality of ultraviolet lights for selectively illuminating the cold water baths and/or heating chamber.

Using an ultraviolet (UV) light has several advantages. As air is transferred into or out of the enclosure, the UV light can be illuminated to disinfect the air. Further, the ultraviolet light can be illuminated to disinfect the water in either of the cold water baths.

In the first and second embodiments, the enclosure (330, 430) further includes a water pumping system (390, 490), which comprises a plurality of water inlet ports (395, 495) and a plurality of water outlet ports (393, 493), each water inlet port having a first end connected to a first end of a controllable water inlet valve (391, 491) of a plurality of water inlet valves; wherein the second end of each controllable water inlet valve is connected to a water source (W); wherein each water outlet port (393, 493) is connected to the first end of a controllable water outlet valve (392, 492) of a plurality of controllable water outlet valves.

In the first and second embodiments, the cyclonic vessel (340, 440) includes a first water inlet port (395a, 495a) connected to a second end of a first water inlet valve (391a, 491a) of the plurality of controllable water inlet valves (391, 491); a first water outlet port (393a, 493a) connected to the second end of a first water outlet valve (392a, 492a) of the plurality of controllable water outlet valves (392, 492).

In the first and second embodiments, the water pumping system (390, 490) further comprises: a water pump (396, 496) and wherein the second end of each of the plurality of controllable water outlet valves (392, 492) is connected to the first end of the pump and the second end of the water pump is connected to a water disposal (398, 498). The water source may be any of a water bottle, water pipe, such as from a city water line. The water disposal may be any of a water collection bottle or a sewer line. The controller has circuitry connected to and configured to control the optional lint grinder and the water pump to flush the water into the water disposal.

In a non-limiting example, the water pump may be of the type VCC-20ULS-230 manufactured by Franklin electric Company, Inc., P.O. Box 12010, Oklahoma City, Okla., USA. This water pump is 12 inches long by 5 inches wide by 5 inches high, operates at 230 VAC, and has a reservoir capacity of 0.25 gallons.

The water pump may be combined with an optional lint grinder. This type of water pump has a reservoir for holding the wastewater. Once the wastewater inside the water pump reaches a specific level, the water pump will turn on, grind the waste into a fine slurry, and water pump it to the water disposal. In a non-limiting example, this type of water pump may be of the type 400700 manufactured by BurCam, 2190 Dagenais Blvd. West, Laval, Quebec, Canada.

In the situation where the enclosure is eliminated, the environmental air intake port (332, 432) is combined with the cyclonic vessel air intake port (344, 444); the air outlet vent (334, 434) is supported by the heating chamber housing (336, 436), the water inlet ports connected to the cyclonic vessel, first cold water bath and second cold water bath, support the water inlet valves. The water outlet ports (393, 493) support the water outlet valves (392, 492). The water pump, heat pump system and controller can stand alone.

Referring to the first embodiment shown by FIG. 3, the cold water bath includes a second water inlet port 395b connected to a second water inlet valve 391b of the plurality of controllable water inlet valves; a second water outlet port 393b connected to a second water outlet valve 392b of the plurality of controllable water outlet valves; wherein the controller includes circuitry connected to and configured to control the water inlet valves and the water outlet valves, as shown by arrow 351.

Referring to the second embodiment shown by FIG. 4, the first cold water bath includes a second water inlet port connected to a second water inlet valve 491b of the plurality of controllable water inlet valves; a second water outlet port 493b connected to a first end of a second water outlet valve 492b of the plurality of controllable water outlet valves.

The second chamber includes a third water inlet port connected to a third water inlet valve 491c of the plurality of controllable water inlet valves; a third water outlet port 493c connected to a first end of a third water outlet valve 492c of the plurality of controllable water outlet valves.

The controller has circuitry configured to control the water inlet valves and the water outlet valves based on the signals received from the water level sensors 418a, 419a and water quality sensor 418c.

In the first and second embodiments, the water in the cold water bath(s) may comprise an antiseptic additive. The antiseptic additive may be at least one of bleach, hydrogen peroxide, hydrogen peroxide adducts, strong acids and their diluted solution, strong bases and their diluted solutions, sodium chloride, ortho-phthalaldehyde (OPA), glutaraldehyde, formaldehyde, povidone-iodine (PVP-I), iodine, iodophores, quaternary ammonium compounds (Quats or QACs), polyquats such as polyquaternium-42, quaternium-15, chlorhexidine gluconate, alcohols (ethanol, isopropyl alcohol), perchlorometaxylenol, and triclosan or a combination of the materials.

Sodium chloride, for example, is bacteriostatic and is a safe and economical method to control microorganism growth in the air when used by the methods described herein. For example, bacteria such as TB, SARS viruses such as influenza, and mold will not be able to grow in the concentrated sodium chloride solution. This is extremely important for control of seasonal viruses such as flu.

In a third embodiment, a method for hybrid humidity control and air purification is described.

The method is first described with respect to FIG. 3. The method begins by turning on a controller 350 and receiving environmental air at a first air intake port 332 fluidly connected to a cyclonic vessel 340 by actuating a first fan located within the first air intake port; providing a water stream in the cyclonic vessel by actuating a first water inlet valve 391*a* connected to a water inlet port 395*a* located in the cyclonic vessel; spinning the environmental air and water stream by adjusting the motor speed of a motor 346 located within the cyclonic vessel, wherein spinning the environmental air propels particulates in the environmental air into the water stream, thus purifying the air and generating a purified air stream; expelling the purified air stream from the cyclonic vessel into a first air tube 336 by actuating a second fan located within a first air output port 342 in the cyclonic vessel.

The method continues by receiving the air tube at a second air intake port located in a first cold water bath 360; fluidly connecting the second air intake port to a first microbubbling filter 362 located in temperature controlled cold water 364; the microbubbling filter separating the purified air stream into microbubbles. The microbubbles then evaporate into a first air volume 366 located above the cold water bath.

The temperature of the water 364 within the first cold water bath 360 is set by controlling the motor speed of a compressor 380 connected to a cooling coil 384 located within the cold water bath. Controlling the temperature of the water 364 in the cold water bath controls the absolute humidity of the air as it evaporates into the air volume. The relative humidity will be 100% when the water temperature is kept to 9.8 degrees Celsius. This value corresponds to a relative humidity of 50% at 21 degrees Celsius, which is the desired relative humidity of the outgoing air, as shown by FIG. 2B.

The method continues by expelling the humidified purified air stream from the first air volume 366 into a cold water bath air tube 338 by actuating a third fan located within a third air output port 368 located within the cold water bath; receiving the cold water bath air tube at a heating chamber air intake port 378 located in the sidewall of a heating chamber 370. Passage of the cold water bath air tube into the heating chamber warms the humidified air stream.

The higher temperature in the heating chamber is due to heat sources such as heat generated by the compressor motor, heat dispelled from incoming (hot) air, heat dispelled from the excess humidity of the incoming air, when the air is too humid at the intake port, heat dispelled from incoming (cold) air, and heat generated by evaporating overly humid incoming water vapor to the air. The air conditioning system of the room or building restores the air temperature to the desired range, preferably 21-23 degrees Celsius. In this temperature range, the air will be at the desired humidity of 50%.

Further temperature control can be achieved by adjusting the expansion valve. In a preferred design, the temperature in the cold water bath is set to remain at 5 degrees Celsius. In another design, the temperature in the cold water bath is set to remain at 9.8 degrees Celsius. Adjusting the expansion valve raises or lowers the pressure of the coolant entering the coils. If the temperature in the cold water bath is too high when compared to a setpoint, the expansion valve pressure is lowered, which results in lowering the temperature of the coolant in the coil. If the temperature of the outgoing air is too low when compared to a setpoint, the expansion valve pressure must be increased to increase the temperature of the coolant in the coil.

The method continues by expelling the humidified air stream into the environment by actuating an exit fan located within air output vent 334 connected to the heating chamber.

The method is carried out by a controller 350 configured to receive signals 352 from sensors (312a,b,c, 316, 318a,b,c, 314a,b,c) in the enclosure 330, the cyclonic vessel 340, the first cold water bath 360 and the air intake port 344 and air output vent 334. The controller actuates the fans, actuates the water valves, adjusts the cyclonic vessel motor speed, controls the motor speed of the compressor, and controls the expansion valve based on the signals received from the sensors.

As shown in FIG. 4, the cold water bath may include a first cold water bath 460a, essentially similar to the first cold water bath 360 of FIG. 3, and a second cold water bath 460b, the second cold water bath having a first chamber 465a containing a phase change material, a second cooling coil 484b and a cooling loop 463; and a second chamber 365b containing a second volume of water 464b, a second microbubbling filter 462b, and a second volume of air 366b located above the second volume of water 364b.

The method further comprises receiving the purified humidified air into the first chamber through an extension of the tube 424 which is connected to a first end of the cooling loop 463; passing the purified humidified air through the cooling loop due to the action the fan in port 468a; separating the purified humidified purified air by passing the purified humidified air through the second microbubbling filter 462b which is connected the second end of the cooling loop, the microbubbling filter 462b immersed in the second volume of water 464b in the second chamber 465b; the microbubbles evaporating into the second air volume 466b; and expelling the humidified purified air stream from the second air volume into a second cold water bath air tube 426 by actuating a fourth fan in a fourth air output port 468b located within the second chamber.

The second cold water bath enables an additional temperature control of the humidity of the second air volume. By using the phase change material in the second cold water bath, the temperature of the second volume of water is stabilized, as excess heat or coldness of the water or the air is absorbed by the phase change material. This refined temperature control enables highly stable temperature control. The design temperature setpoint can be selected to be 5 degrees Celsius. At this temperature, the water cannot support biological growth. When the water in 464b is at 5 degrees Celsius, the relative humidity of the air exiting the device will be controlled to within a range of 32-37%, when the environmental temperature is in the range of 21-23 degrees Celsius. The phase change material may be encapsulated and changes phase at 5 degrees Celsius.

Environmental and clinical literature does not specify an ideal relative humidity setting for the human body. The recommended relative humidity is within 25-60%, with some indication that 40% is a better value compared to 30% from physiological perspective.

If desired, the device can be set to produce air at a humidity level of 50% at 21 degrees Celsius. In this situation, the design temperature setpoint is selected to be 9.8 degrees Celsius. In this situation, the phase change material should be one which changes phase at 9.8 degrees Celsius, for best temperature stabilization. The relative humidity of the air exiting the device will thus be controlled to within a range of 47-53%, when the environmental temperature is in the range of 20-22 degrees Celsius. In general, water bath temperature and the environmental air temperature both determine the relative humidity. This invention provides the ability to set the relative humidity of the outgoing air based on the water bath temperature.

When the temperature setpoint in the cold water bath is set above 5 degrees Celsius, biological growth in the water is a concern. Biological growth can be controlled by adding an antiseptic to the water, irradiating the water with ultraviolet light (376, 476), or periodic heating by secondary heater (337, 437) of the cyclonic vessel and cold water baths to sterilize the devices, as shown in FIGS. 3 and 4 and as described below.

The second cold water bath includes a fourth temperature sensor 419b located in the first chamber 465a. The controller is configured to control the temperature of the first chamber, based on signals 452 received from the temperature sensor 419b, by controlling the motor speed of the compressor 480 connected to the second cooling coil 484b.

The first air intake port (332, 432) further comprises a first temperature sensor (312b, 412b), a first relative humidity sensor (312a, 412a) and a first particulate sensor (312c, 412c), the first fan having an adjustable speed, wherein the controller has circuitry configured for measuring the particulate matter, the temperature and the relative humidity of the environmental air entering the cyclonic vessel and for adjusting the fan speed, based on signals received from the sensors. For example, if the environmental air has a high particulate matter content, the fan speed should be lowered, in order to decrease the amount of air entering the enclosure. This will allow the air to remain in the cyclonic vessel for a longer time which will result in cleaner air.

The cyclonic vessel further includes a first water level sensor (316, 416) and a first water outlet valve (392a, 492a), the controller (350, 450) actuating the valves based on signals (352, 452) received from the first water level sensor.

The cold water bath further includes a second water inlet valve (391b, 491b), a second water outlet valve (392b, 393b), a second temperature sensor (318b, 418b), a second water level sensor (318a, 418a) and a first water quality sensor (318c, 418c); the method comprising measuring the water temperature, the water level, and the water quality; controlling the second water inlet valve, the second water outlet valve, the water level and the water quality based on signals received from second water level and first water quality sensors; and controlling the motor speed of the compressor and the motor speed of the fans based on the signals received from the temperature sensors.

The enclosure air output vent (334, 434) includes an air output vent temperature sensor (314b, 414b) and a second relative humidity sensor (314a, 414a). The method includes the controller adjusting the variable expansion valve (382, 482) based on signals 352 received from the air outlet vent temperature sensor and the second relative humidity sensor.

In further detail as shown in FIGS. 3 and 4, the cyclonic vessel (340, 440) includes a first water outlet valve (392a, 492a); the first cold water bath (360, 464a) further includes a first water quality sensor (318c, 418c), a second water level sensor (318a, 418a), a second water inlet valve (391b, 491b) and a second water outlet valve (392b, 492b); further, the water pump is connected to the water outlet valves and to a sewer line 498 or water collection bottle.

The method further includes the controller actuating (see arrow 451 connected to the controller indicating control signals transmitted by the controller) the water inlet and water outlet valves, and the water pump based on signals (352, 452) received from the water level and water quality sensors.

The method includes thermally insulating the heating chamber from the cooling water bath by constructing a housing 436 surrounding the heating chamber 470, the housing including a double walled heat shield located around the heating chamber, the heat shield comprising thermally insulative material between the walls. Top, bottom, side and rear walls are all formed so that they are between ¼ inch and 2 inches thick. Preferably all of the walls are 1 inch thick. The thickness of all of the walls is also preferably substantially uniform throughout the entire jacket 16. However, the thickness of the walls of the housing (336, 436) should be sized in accordance with the dimensions of the hybrid humidity control and air purification device. A large installation, such as a factory, would require much greater dimensions for the hybrid humidity control and air purification device than a single room in a personal residence.

Thermally insulative materials can include at least one or a combination of fiberglass, wool, glasswool, ceramic, cellulose, natural fibers, polystyrene, polyisocyanurate, polyurethane, vermiculite, perlite, foam.

The walls of the housing (336, 436) can be constructed of steel, fiberglass, plastic, cardboard, drywall, particle board, or any other material appropriate to providing a structure for holding the thermally insulative materials.

Alternatively, the housing (336, 436) can be an insulation jacket, such as the type shown by U.S. patent application 2008/0156788. Such a jacket is formed of any one or more of a variety of different types of insulating materials, such as fiberglass, mineral wool, refractory ceramic fiber (RCF), body soluble fiber (Non-RCF), silica fiber, mullite, or any other low density insulation material that ranges from 1 pound per cubic foot to 20 pounds per cubic foot.

An optional second housing having double walled insulation (not shown), as described for the first housing (336, 446), can be constructed to surround the cold water bath in the first embodiment or the cold water baths in the second embodiment. The second housing would allow the device to operate more efficiently, thus saving energy.

Also within the enclosure (330, 430) is a secondary heater (337, 437) having a heating control switch. The secondary heater is used to initiate a sterilization cycle when the water becomes contaminated by algae growth or other contaminants. The controller includes circuitry configured for initiating the sterilization cycle by actuating the heating control switch to raise the temperature in the enclosure to a temperature range of 60-100 degrees Celsius for a time period based on the measurement of the water quality sensors (318c, 418c).

The controller comprises circuitry configured for the following selectable control modes: (i) controlling the temperature of the water within the cold water bath to within a range of 9-10 degrees Celsius, and controlling the relative humidity of the humidified purified air stream expelled into the environment to within the range of 45-55%; (ii) controlling the temperature of the water within the cold water bath to within a range of 4.5-5 degrees Celsius and controlling the relative humidity of the humidified purified air stream expelled into the environment to within the range of 30-50%; (iii) controlling the temperature of the water within the cold water bath to a range of 4.5-10 degrees Celsius and controlling the relative humidity of the humidified purified air stream expelled into the environment to within a range of 30-60%; and (iv) heating the humidified purified air stream expelled into the environment. For best control of the humidity of the expelled air, the environmental air is assumed to be kept within a temperature range of 21-23 degrees Celsius by a separate room or building air conditioning system, which is not part of the present disclosure.

The second embodiment as shown by FIG. 4 is now described in more detail.

The hybrid humidity control and air purification device, comprises: an enclosure 430 including; a cyclonic vessel 440 having a controllable motor 446; a cold water bath which includes a first cold water bath 460a containing a first volume of water 464a, a first microbubbling filter 462a immersed in the first volume of water, a first cooling coil 484a and a first volume of air 466a; a second cold water bath 460b, wherein the second cold water bath includes a first chamber 465a including a second cooling coil 484b, a cooling loop 463 and a phase change material which fills the first chamber, and a second chamber 465b. The enclosure further includes a heating chamber 470, which has heating coil 474 and which may be surrounded by a double wall 436 filled with thermal insulation; wherein an expansion valve 482 is located between a second cooling coil 484b and the heating coil 474, wherein the first cooling coil is immersed in the first volume of water, the second cooling coil is placed in the phase change material and the heating coil is located in the heating chamber; a water level controlling system including controllable water inlet valves 491 and water outlet valves 492 in each of the cyclonic vessel, the first cold water bath, and the second chamber; a water pumping system 490 to flush water from the cyclonic vessel, the first cold water bath, and the second chamber; an air moving system which includes: air intake ports and air output ports located within the enclosure, the cyclonic vessel, the first cold water bath and the second chamber; the air intake and air output ports including fans; first air tubing 422 connected between the air output port of the cyclonic vessel and the air input port of the first cold water bath; second air tubing connected between the air input port of the first cold water bath and the first microbubbling filter; third air tubing 424 connected between the air output port of the first cold water bath and the air intake port of the first chamber; fourth air tubing connected between the first chamber and the first end of the cooling loop 463; fifth air tubing connected between the second end of the cooling loop and the second microbubbling filter; sixth air tubing 426 connected between the air output port of the second chamber and the air intake port of the heating chamber; seventh air tubing connected between the air intake port of the heating chamber and a support bracket 472 within the heating chamber; a first set of sensors for measuring particulate matter, relative humidity and temperature of the air in the enclosure; a second set of sensors for measuring the water level in the cyclonic vessel, and the water level, water quality and temperature of the water in the first and second cold water baths; a controller 450 having circuitry connected to and configured to control the controllable fans, the compressor motor, the controllable valves, the cyclonic vessel controllable motor; wherein the controller is further connected to and has circuitry configured to receive signals 452 from the sensors; wherein the controller circuitry is further configured to control the relative humidity, temperature and air quality of the air expelled through the environmental air outlet vent based on the signals received from the sensors.

Figure 5:
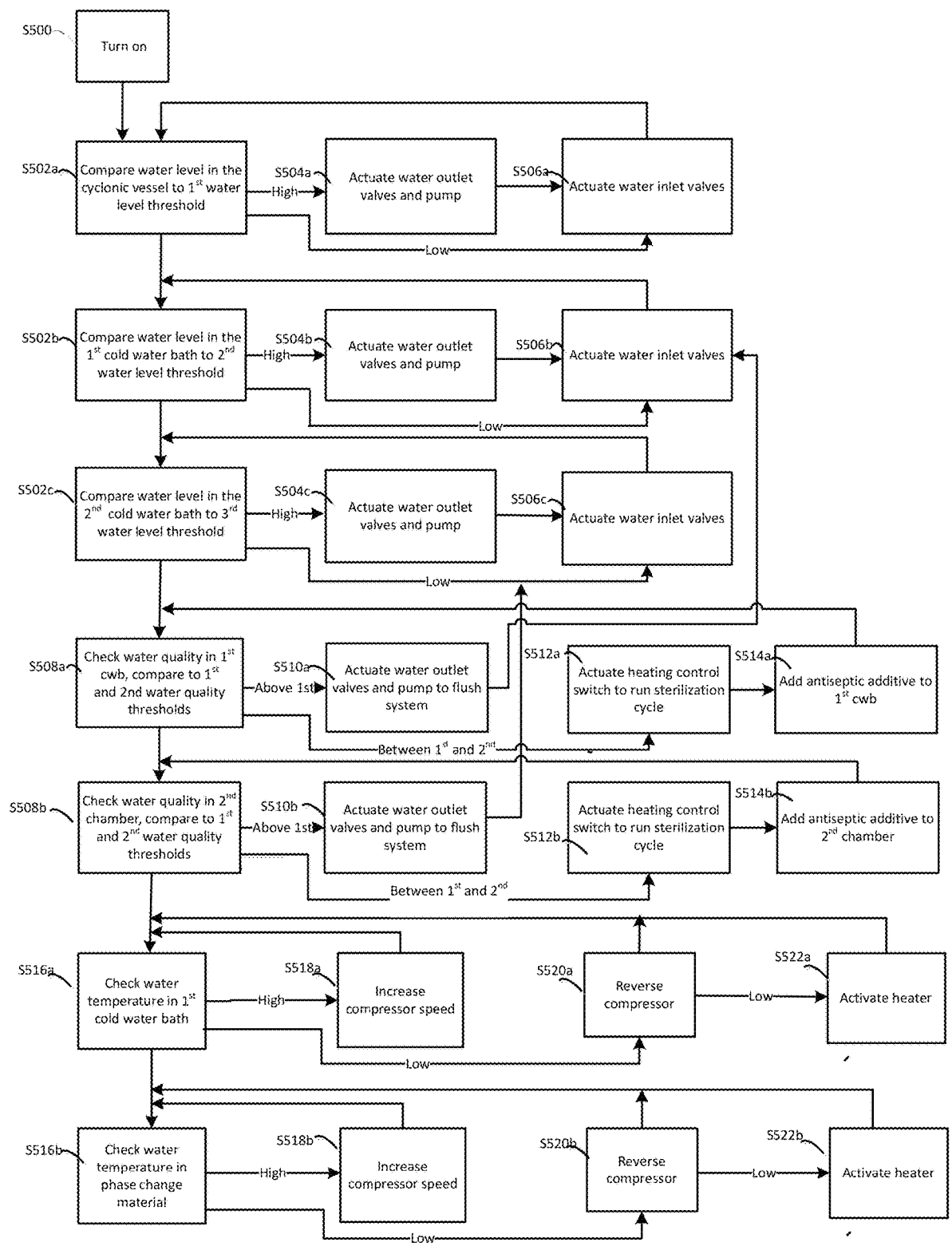
FIG. 5 describes the calibration of the water levels and water quality in the cyclonic vessel and the first and second cold water baths.

Next, an exemplary flow chart of a method for calibrating the hybrid control and air purification device is described with respect to the flowchart shown in FIG. 5.

The method starts at S500 by turning on a switch connected to the controller. At S502a the controller controls the water level in the cyclonic vessel by comparing the water level to a first water level threshold level; actuating a first water outlet valve and a water pump when the water level is higher than the first water level threshold at S504a; and actuating a first water inlet valve connected to a water source when the water level is lower than the first water level threshold as shown at S506a.

The method continues by controlling the water level in the first cold water bath by comparing the water level to a second water level threshold level at S502b; actuating a second water outlet valve and a water pump when the second water level is higher than the second water level threshold at S504b; actuating a second water inlet valve connected to a water source when the second water level is lower than the second water level threshold at S506b.

The water level in a second cold water bath is compared to a third water level threshold level at S502c. The method controls the water level by actuating a third water outlet valve and a water pump when the third water level is higher than the third water level threshold at S504c; and actuating a third water inlet valve connected to a water source when the third water level is lower than the third water level threshold at S506c.

Next, a water quality check is done. The controller starts by comparing the water quality in the first cold water bath to a first water quality threshold at S508a; flushing the first cold water bath by actuating the water outlet valve, actuating a water pump including an optional lint grinder when the water quality above the first water quality threshold at S510a, then actuating the second water inlet valve to refill the first cold water bath at S506b; actuating a heating control switch on a secondary heating coil to enable a sterilization cycle at S512a, and adding an antiseptic additive to the cold water bath when the water quality is below the first water quality threshold but above a second water quality threshold at S514a.

S508b demonstrates controlling water quality in the second cold water bath by comparing the water quality in the second cold water bath to the first water quality threshold; flushing the second cold water bath by actuating the third water outlet valve, then actuating the water pump when the water quality above the first water quality threshold at S510b, then actuating the third water inlet valve to refill the second cold water bath at S506b; actuating a heating control switch on a secondary heating coil to enable a sterilization cycle at S512b, and adding an antiseptic additive to the cold water bath when the water quality is below the first water quality threshold but above the second water quality threshold at S514b.

Step S516a demonstrates controlling the water temperature in the first cold water bath by comparing the temperature of the water in the first cold water bath to a first temperature setpoint; increasing the speed of the motor of a compressor connected to a first cooling coil in the first cold water bath when the water temperature is above the first temperature threshold at S518a; when the temperature is below the first temperature threshold, wherein the first temperature threshold is in the range of 4.5-10 degrees Celsius, reversing the compressor motor at S520a and activating the heating control switch on the secondary heating coil at S522a.

Step S516b demonstrates controlling the water temperature in the second cold water bath by comparing the temperature of the phase change material in the first chamber of the second cold water bath to a second temperature threshold, wherein the second temperature threshold is selected from the range of 4.5-10 degrees Celsius; increasing the speed of the motor of a compressor connected to a second cooling coil in the second cold water bath when the water temperature is above the second temperature threshold at S518b; when the temperature is below the second temperature threshold, reversing the compressor motor at S520b and activating the heating control switch on the secondary heating coil as at S522b.

Figure 6:
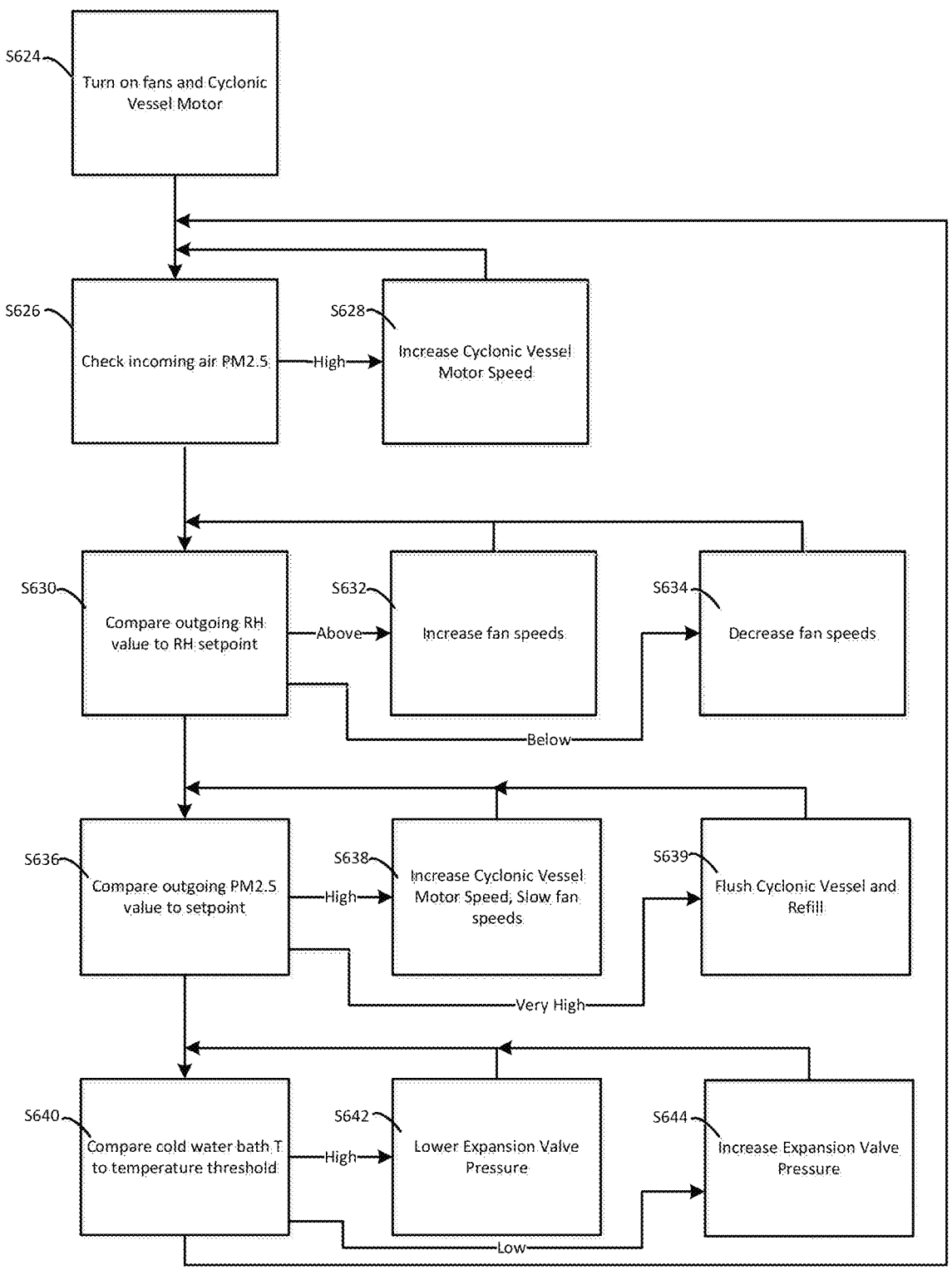
FIG. 6 details settings of the fan and cyclonic vessel motor speeds with respect to environmental air conditions.

Next, a method for operating the hybrid humidity control and air purification device of claim 1 is described with respect to FIG. 6.

The method starts by turning on the fans and the cyclonic vessel motor at step S624; comparing incoming environmental air to a particulate matter threshold at S626, wherein the cyclonic vessel motor speed is increased if the particulate matter is above the threshold as shown at S628; comparing the outgoing air at the second air outlet vent to a relative humidity setpoint at S630, wherein the fan speeds are increased when the relative humidity is above the setpoint at S632, and wherein the fan speeds are decreased when the relative humidity is below the setpoint at S634; comparing the outgoing air at the second air outlet vent to a first particulate matter threshold at S636, wherein the cyclonic vessel motor speed is increased and the fan speeds are decreased when the particulate matter is above the first particulate matter threshold and below a second particulate matter threshold as shown at S638, and wherein the water pump and the cyclonic vessel water outlet valve are actuated to flush the water from the cyclonic vessel when the particulate matter is above the second particulate matter threshold, then refilling the cyclonic vessel at S639; comparing the cold water bath temperature to a temperature threshold at S640; lowering the expansion valve pressure when the temperature is above the threshold at S642, and increasing the expansion valve pressure when the temperature is above the temperature threshold at S644.

In the embodiments shown above, the speed of the compressor motor controls the water pumping speed of the heat pump. Table 3 shows the water pumping speed levels to which the compressor motor is set based on the relative humidity and particulate matter content of the environmental air entering the device.

TABLE 3

Compressor Water pumping Speed With Respect To Relative Humidity And Particulate Matter Content Of Environmental Air.

| Pumping speed level | Relative Humidity Level | PM2.5 (micro gram/m3) |
|---|---|---|
| High | 0-20% or 80-100% | Greater than 100 |
| Medium | 20-35% or 55-75% | 51-100 |
| Low | 35-55% | 0-50 |

Further, although not explicitly shown, the controller switch may be remotely controlled. Additionally, the controller circuitry further includes a computing device having hardware and software in order to accomplish the controlling described above.

Figure 7:
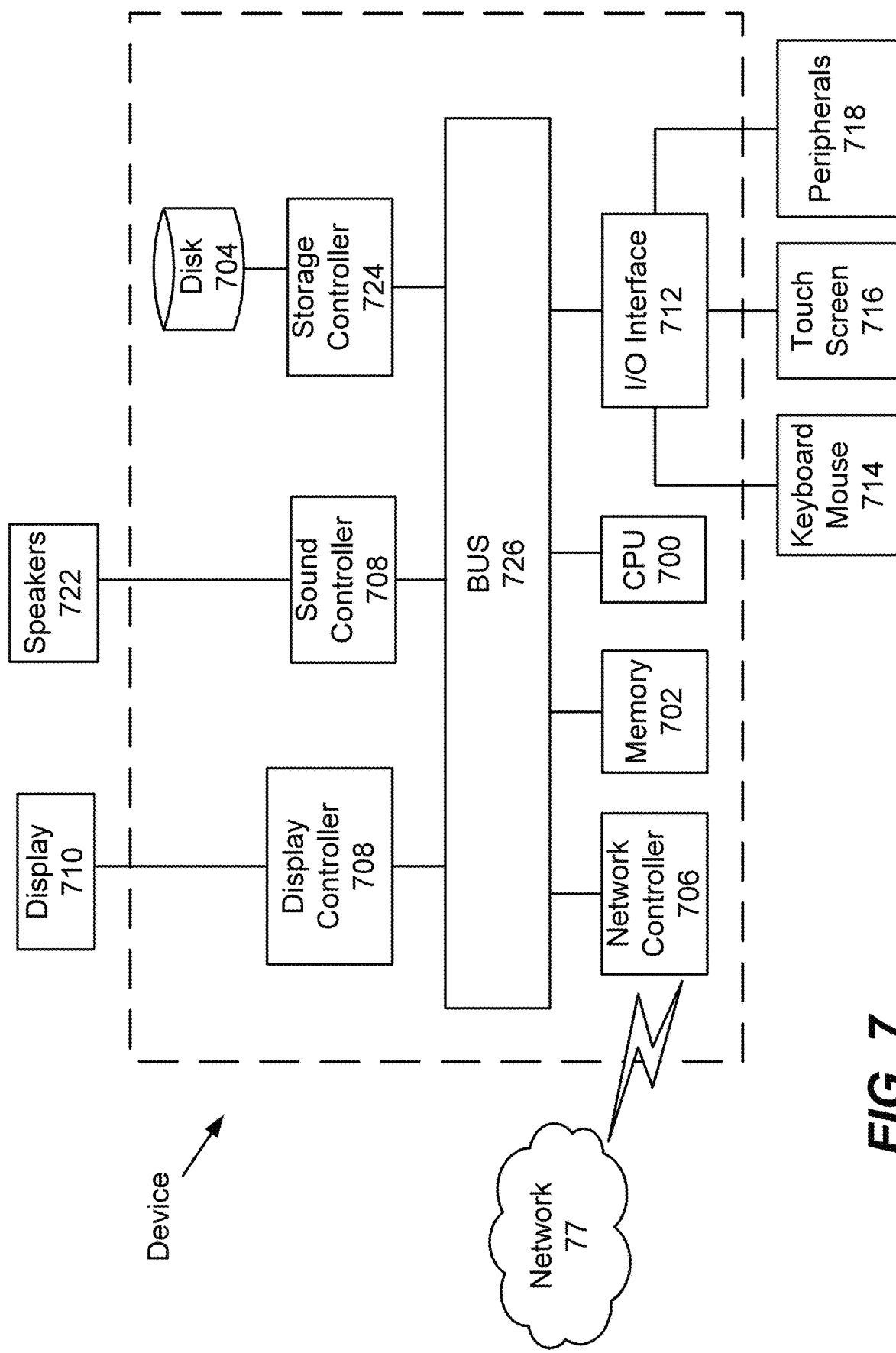
FIG. 7 shows hardware for the controller used in the exemplary embodiments.

Next, a hardware description of the computing device according to exemplary embodiments is described with reference to FIG. 7. In FIG. 7, the computing device includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNIT, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN subnetworks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
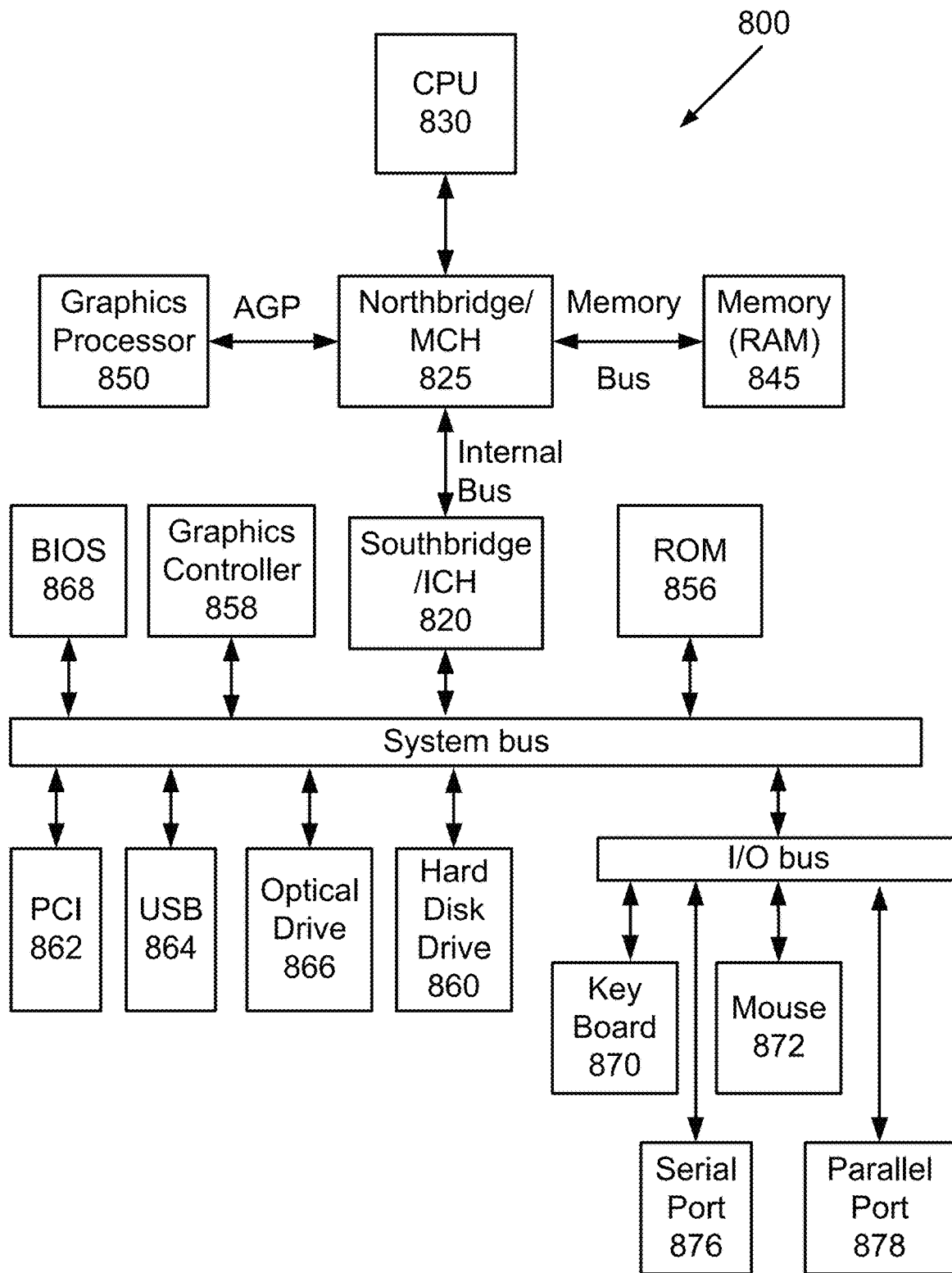
FIG. 8 shows a data processing system hub used in the exemplary embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
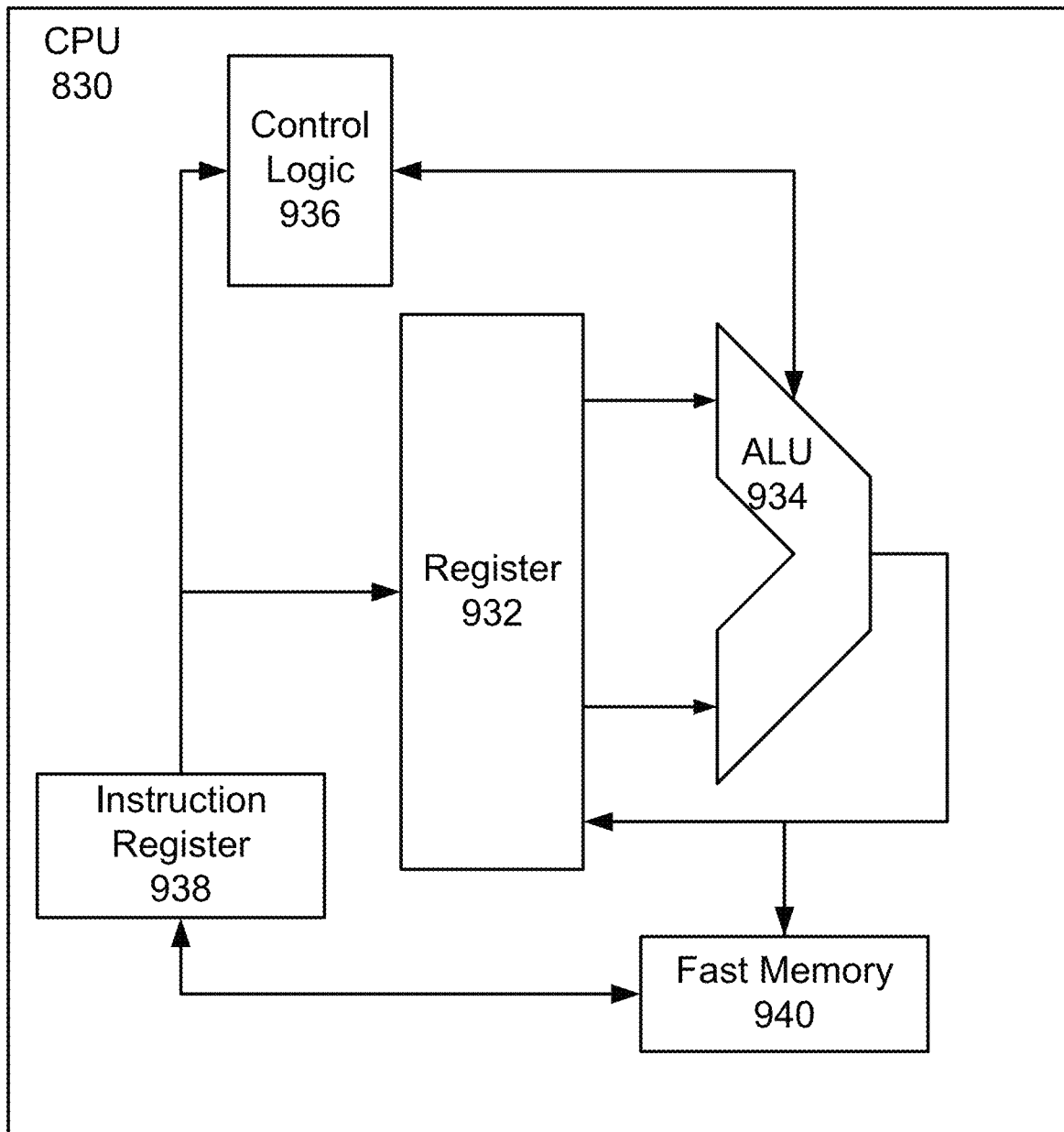
FIG. 9 shows circuitry configured to perform features of the invention.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
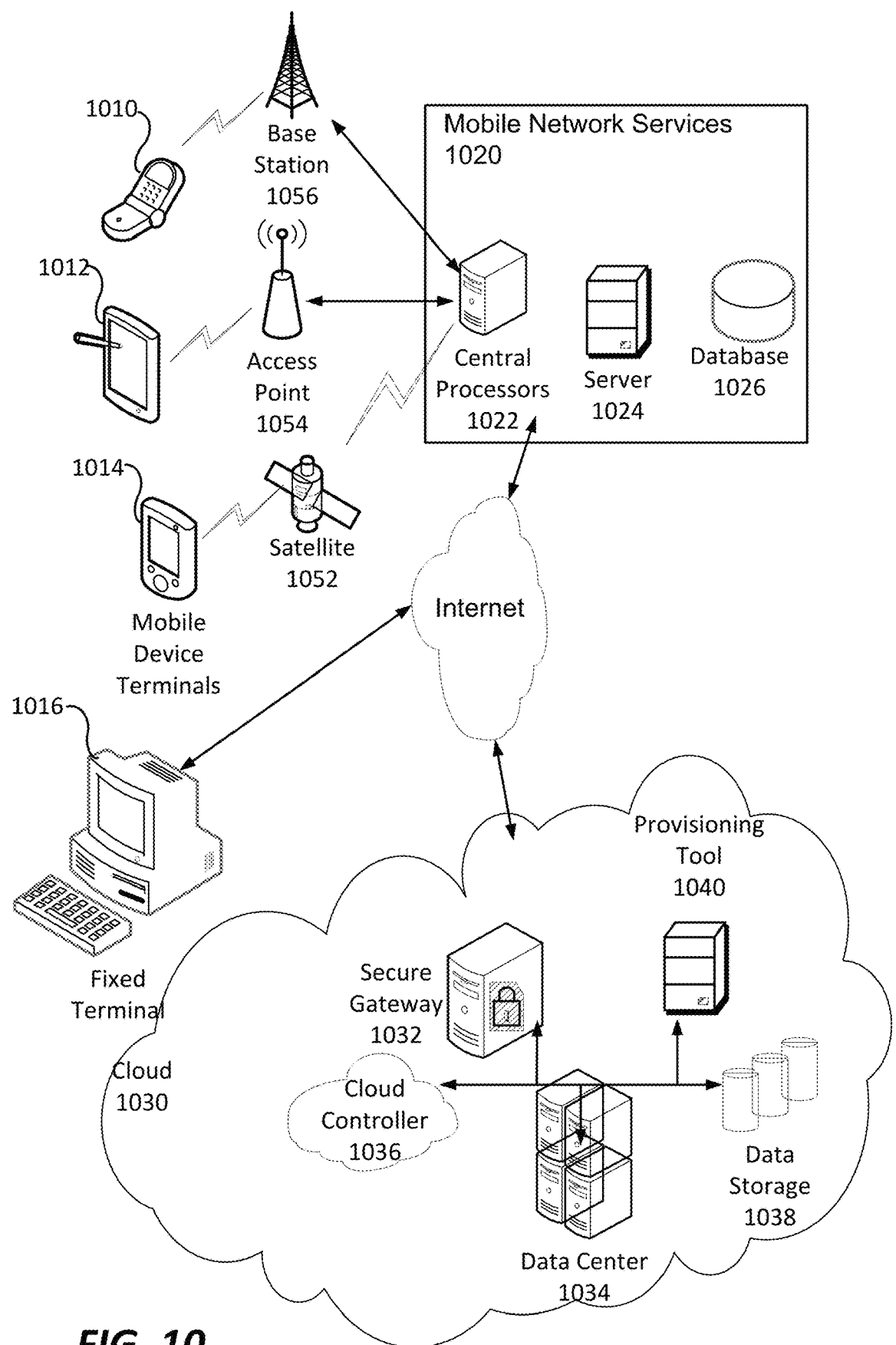
FIG. 10 shows distributed components including one or more client and server machines, which may share processing.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings.

In a non-limiting example, the cyclonic vessel as shown in FIGS. 3 and 4 may be optional in situations where the environmental air is not particulate laden, such as air which is already filtered by an air conditioning system. A simplified device could have only the cold water bath 360 and the heating chamber, with some means for temperature control. It is therefore to be understood that within the scope of the appended claims, the invention may be practiced otherwise than as specifically described herein.

The invention claimed is:

1. A hybrid humidity control and air purification device, comprising:
an enclosure which includes an environmental air intake port including a first controllable fan, wherein the environmental air intake port includes a first particulate matter sensor, a first relative humidity sensor and a first temperature sensor; an environmental air outlet vent having a second controllable fan, a second temperature sensor, a second relative humidity sensor and a second particulate matter sensor; wherein the enclosure further includes:
a cyclonic vessel which has a cyclonic vessel air intake port connected to the environmental air intake port; a cyclonic vessel air outlet port including a third controllable fan, the cyclonic vessel air outlet port connected to the first end of a cyclonic vessel air outlet tube; a first water level sensor; and a controllable cyclonic vessel motor, wherein the cyclonic vessel is in the shape of a vertically oriented truncated cone with a wide portion disposed at an upper end of the truncated cone and a narrow portion disposed at a lower end of the truncated cone, and wherein the cyclonic vessel comprises a spray ring disposed inside the cyclonic vessel at the upper end, said spray ring having a plurality of holes configured to direct water to the interior sides of the cyclonic vessel;
a cold water bath, wherein the cold water bath includes a cold water bath air intake port to receive the second end of the cyclonic vessel air outlet tube; a volume of water; a cooling coil located in the volume of water; a second water level sensor, a third temperature sensor and a first water quality sensor located within the volume of water; a microbubbling filter connected to the second end of the first air outlet tube; a volume of air located above the volume of water; a cold water bath air outlet port located above the volume of air, the cold water bath air outlet port including a fourth controllable fan; the cold water bath air outlet port connected to the first end of a cold water bath air outlet tube;
a heating chamber which includes a heating chamber air intake port for receiving the second end of the cold water bath air outlet tube; a support, wherein the support is connected to the second end of the second air outlet tube; a heating coil; wherein the heating chamber is connected to the environmental air outlet vent;
a heat pump which comprises a compressor having a controllable compressor motor,
wherein the compressor is connected to the cooling coil, a variable expansion valve, and the heating coil, wherein the variable expansion valve is connected between the cooling coil and the heating coil;
a controller having circuitry connected to and configured to control the cyclonic vessel motor; the controllable fans; the compressor motor and the variable expansion valve;
wherein the controller is further connected to and has circuitry configured to receive signals from the particulate matter sensors, the relative humidity sensors, the temperature sensors, the first water quality sensor, and the water level sensors,
wherein the controller circuitry is configured to control temperature of the cold water bath, the relative humidity and air quality of the air expelled through the environmental air outlet vent, based on the signals received from the sensors.

2. The hybrid humidity control and air purification device of claim 1, wherein the
cold water bath further comprises:
a first cold water bath and a second cold water bath,
wherein the first cold water bath includes a first cold water bath air intake port configured to receive the second end of the cyclonic vessel air outlet tube; a first volume of water; a first cooling coil located in the first volume of water; the second water level sensor, the third temperature sensor and a first water quality sensor located within the first volume of water; a first microbubbling filter connected to the second end of the cyclonic vessel air outlet tube; a first volume of air located above the first volume of water; a first cold water bath air outlet port located above the first volume of air, the first cold water bath air outlet port including a fourth controllable fan; the first cold water bath air outlet port connected to the first end of a first cold water bath air outlet tube;

wherein the second cold water bath includes a first chamber which has a second cold water bath air intake port configured to receive the second end of the first cold water bath air outlet tube; a volume of phase change material, wherein the phase change material is selected from the group of a phase change material with phase changing temperature of 5 degrees Celsius and a phase changing material with phase changing temperature of 4-10 degrees; a fourth temperature sensor, a second cooling coil and a cooling loop having a first end and a second end, wherein the second end of the first cold water bath air outlet tube is connected to the first end of the cooling loop; a second chamber, wherein the second chamber contains a second volume of water, a second water quality sensor, a third water level sensor, a second microbubbling filter fluidly connected to the second end of the cooling loop; a second volume of air located above the second volume of water, and a second cold water bath air outlet port including a fifth controllable fan, wherein the second cold water bath air outlet port is connected to the first end of a second cold water bath air outlet tube.

3. The hybrid humidity control and air purification device of claim 1, wherein the
enclosure further includes an optional controllable ultraviolet light, and the controller actuates the optional controllable ultraviolet light based on the measurements of the first water quality sensor.

4. The hybrid humidity control and air purification device of claim 1, wherein the enclosure further includes a water pumping system, comprising:
a plurality of water inlet ports and a plurality of water outlet ports, each water inlet port having a first end connected to a first end of a controllable water inlet valve of a plurality of water inlet valves; wherein the second end of each controllable water inlet valve is connected to a water source; wherein each water outlet port is connected to the first end of a controllable water outlet valve of a plurality of controllable water outlet valves;
wherein the cyclonic vessel includes a first water inlet port connected to a second end of a first water inlet valve of the plurality of controllable water inlet valves; a first water outlet port connected to the second end of a first water outlet valve of the plurality of controllable water outlet valves;
wherein the cold water bath includes a second water inlet port connected to a second water inlet valve of the plurality of controllable water inlet valves; a second water outlet port connected to a second water outlet valve of the plurality of controllable water outlet valves; wherein the controller includes circuitry connected to and configured to control the water inlet valves and the water outlet valves.

5. The hybrid humidity control and air purification device of claim 4, wherein the water pumping system further comprises:
a water pump having an optional lint grinder, wherein the second end of each of the plurality of controllable water outlet valves is connected to the first end of the water pump and the second end of the water pump is connected to a water disposal;
wherein the water source is a water bottle and the water disposal is a water collection bottle; or
wherein the water source is a water pipe and the water disposal is a sewer line; and wherein the controller has circuitry connected to and configured to control the water pump to flush the water into the water disposal.

6. The hybrid humidity control and air purification device of claim 2, wherein the enclosure further includes a water pumping system, comprising:
a plurality of water inlet ports and a plurality of water outlet ports, each water inlet port having a first end connected to a first end of a controllable water inlet valve of a plurality of water inlet valves; wherein the second end of each controllable water inlet valve is connected to a water source; wherein each water outlet port is connected to the first end of a controllable water outlet valve of a plurality of controllable water outlet valves;
wherein the first cold water bath includes a second water inlet port connected to a second water inlet valve of the plurality of controllable water inlet valves; a second water outlet port connected to a first end of a second water outlet valve of the plurality of controllable water outlet valves;
wherein the second chamber includes a third water inlet port connected to a third water inlet valve of the plurality of controllable water inlet valves; a third water outlet port connected to a first end of a third water outlet valve of the plurality of controllable water outlet valves;
wherein the controller has circuitry configured to control the water inlet valves and the water outlet valves based on the signals received from the water level and water quality sensors.

7. The hybrid humidity control and air purification device of claim 1, wherein the cold water bath further comprises a spray nozzle which sprays water droplets into the volume of air exiting the volume of water, wherein the water droplets increase the humidity of the environmental air as it passes from the volume of water into the cold water bath air outlet port.

* * * * *